(12) United States Patent
Kikuchi

(10) Patent No.: US 6,891,659 B2
(45) Date of Patent: May 10, 2005

(54) OPTICAL AMPLIFIERS, OPTICAL FIBER RAMAN AMPLIFIERS AND OPTICAL SYSTEMS

(75) Inventor: Nobuhiko Kikuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 31 days.

(21) Appl. No.: 09/796,617

(22) Filed: Mar. 2, 2001

(65) Prior Publication Data

US 2004/0201882 A1 Oct. 14, 2004

(30) Foreign Application Priority Data

Jan. 29, 2001 (JP) ........................................ 2001-019660

(51) Int. Cl.$^7$ .............................................. H01S 3/00
(52) U.S. Cl. ...................................................... 359/334
(58) Field of Search ........................... 359/334, 341.41, 359/341.42, 341.44, 177

(56) References Cited

U.S. PATENT DOCUMENTS

| | | | | | |
|---|---|---|---|---|---|
| 4,449,043 A | * | 5/1984 | Husbands | .................... | 250/205 |
| 4,570,081 A | * | 2/1986 | Baldwin | ...................... | 359/327 |
| 4,805,977 A | * | 2/1989 | Tamura et al. | ................. | 385/47 |
| 4,900,917 A | * | 2/1990 | Dixon et al. | ................. | 250/225 |
| 5,185,814 A | * | 2/1993 | Healey | ........................ | 359/127 |
| 5,241,414 A | * | 8/1993 | Giles et al. | ............ | 359/341.33 |
| 5,280,549 A | * | 1/1994 | Barnard et al. | ................ | 385/15 |
| 5,298,965 A | * | 3/1994 | Spirit et al. | ................. | 356/73.1 |
| 5,319,482 A | * | 6/1994 | Tsuchiya et al. | .............. | 398/31 |
| 5,343,286 A | * | 8/1994 | Keeble et al. | .............. | 356/73.1 |
| 5,504,617 A | * | 4/1996 | Spirit | ..................... | 359/341.43 |
| 5,506,724 A | * | 4/1996 | Shimizu et al. | ............. | 359/337 |
| 5,600,481 A | * | 2/1997 | Nakabayashi | .......... | 359/337.13 |
| 5,633,741 A | * | 5/1997 | Giles | ........................... | 359/110 |
| 5,633,749 A | * | 5/1997 | Shibuya | ...................... | 359/177 |
| 5,680,246 A | * | 10/1997 | Takahashi et al. | .......... | 359/160 |
| 5,729,372 A | * | 3/1998 | Terahara et al. | ............ | 398/182 |
| 5,784,192 A | * | 7/1998 | Sugiyama et al. | ..... | 359/341.42 |
| 5,808,785 A | * | 9/1998 | Nakabayashi | .......... | 359/337.13 |
| 5,859,725 A | * | 1/1999 | Sugiya et al. | .......... | 359/337.13 |
| 5,864,423 A | * | 1/1999 | Kosaka | .................... | 359/337.11 |
| H001791 H | * | 3/1999 | Williams | ...................... | 191/48 |
| 5,883,735 A | * | 3/1999 | Sugiyama et al. | ..... | 359/341.42 |
| 5,887,093 A | * | 3/1999 | Hansen et al. | ................. | 385/27 |
| 5,914,795 A | * | 6/1999 | Jourdan et al. | ............. | 359/134 |
| 5,963,362 A | * | 10/1999 | Fukaishi | ..................... | 359/137 |
| 5,999,548 A | * | 12/1999 | Mori et al. | ..................... | 372/22 |
| 6,049,413 A | * | 4/2000 | Taylor et al. | ................ | 359/161 |
| 6,052,393 A | * | 4/2000 | Islam | .......................... | 356/460 |
| 6,055,092 A | * | 4/2000 | Sugaya et al. | ............. | 359/134 |
| 6,055,094 A | * | 4/2000 | Shima et al. | ................ | 359/124 |

(Continued)

FOREIGN PATENT DOCUMENTS

| | | |
|---|---|---|
| JP | 07-190887 | 7/1995 |
| JP | 07-240717 | 9/1995 |

*Primary Examiner*—Thomas H. Tarcza
*Assistant Examiner*—Deandra M. Hughes
(74) *Attorney, Agent, or Firm*—Antonelli, Terry, Stout & Kraus, LLP

(57) ABSTRACT

An object of the present invention is to prevent an interruption circuit of an optical amplifier from malfunctioning due to Raman pump wave. A typical mode of the present invention is characterized in that an pump wave elimination filter is inserted before an input-light detector and a reflected-light detector which constitute the optical amplifier. This permits only a signal component to be detected, enabling interruption operation, while eliminating a remaining component of Raman pump wave transmitted from for example a downstream of an optical fiber transmission line. In addition, a judgment threshold value for the interruption operation is changed according to ON/OFF condition of the pump wave. Or the Raman pump wave itself is used for detecting output's open.

20 Claims, 8 Drawing Sheets

U.S. PATENT DOCUMENTS

| | | | | |
|---|---|---|---|---|
| 6,067,187 A | * | 5/2000 | Onaka et al. | 359/160 |
| 6,072,614 A | * | 6/2000 | Roberts | 359/110 |
| 6,088,152 A | * | 7/2000 | Berger et al. | 359/124 |
| 6,160,942 A | * | 12/2000 | Watanabe | 385/122 |
| 6,262,288 B1 | * | 7/2001 | Fehr et al. | 549/512 |
| 6,263,396 B1 | * | 7/2001 | Cottle et al. | 710/263 |
| 6,295,147 B1 | * | 9/2001 | Yamane et al. | 398/9 |
| 6,304,368 B1 | * | 10/2001 | Hansen et al. | 359/134 |
| 6,317,255 B1 | * | 11/2001 | Fatehi et al. | 359/177 |
| 6,337,764 B1 | * | 1/2002 | Yoon et al. | 359/337.1 |
| 6,359,725 B1 | * | 3/2002 | Islam | 359/334 |
| 6,373,621 B1 | * | 4/2002 | Large et al. | 359/334 |
| 6,407,854 B1 | * | 6/2002 | Shum | 359/341.41 |
| 6,469,824 B2 | * | 10/2002 | Sasaki | 359/341.44 |
| 6,547,453 B1 | * | 4/2003 | Stummer et al. | 385/88 |

* cited by examiner

OPTICAL AMPLIFIERS, OPTICAL FIBER RAMAN AMPLIFIERS AND OPTICAL SYSTEMS

BACKGROUND OF THE INVENTION

1. Field of the Invention

The present invention relates to an optical system that uses Raman pump wave. Typical examples of the optical system include an optical amplifier; a Raman pump wave emitting device, for example, a Raman pump wave emitting device for optical amplification by stimulated Raman effect in an optical fiber; and an optical repeater; or an optical system in which those devices are used.

2. Related Arts

Wavelength division multiplexing (WDM) optical-transmission method, by which a plurality of optical signals having a different wavelength one another are multiplexed in an optical fiber to transmit information, is a very effective method for increasing capacity of optical fiber communication. For the purpose of repeating/amplifying such optical signals, the following optical fiber amplifiers are used: an optical fiber amplifier doped with rare-earth elements such as EDFA (Erbium-doped Fiber Amplifier); a semiconductor optical amplifier; and a Raman amplifier. Those optical amplifiers are used as a post-amplifier that is located on an upstream side of an optical fiber transmission line, and that amplifies a transmission optical signal with one wavelength or a plurality of wavelengths to obtain a large optical power for outputting. In addition, the optical amplifiers are widely used as the following: a preamplifier that is located on a downstream side of an optical fiber transmission line, and that amplifies a attenuated optical signal after transmission to receive the signal; an optical repeater that amplifies an optical signal after transmission to forward the signal to the next optical fiber transmission line; and the like.

Among those optical amplifiers, in particular EDFA that has already become widespread in optical fiber transmission systems for commercial use is equipped with an interruption circuit that detects a loss of an input signal and open of an output end (such as connector's open and fiber's cut) to interrupt an output of the optical amplifier. A method for detecting a loss of an input signal to interrupt an optical amplifier is described in Japanese Patent Application Laid-Open No. Hei 7-240717 (Literature 1) for example. A method for detecting an output connector's open to interrupt an optical amplifier is described in Japanese Patent Application Laid-Open No. Hei 07-190887 (Literature 2) for example, and others.

FIG. 2 illustrates a configuration of conventional optical amplifier 100 having an interrupting mechanism by detecting a loss of input light and output's open. The optical amplifier 100 amplifies an optical signal, which has been input from an input light connector 101, using an optical amplification medium 103 such as EDF (Erbium Doped Fiber) to output the signal from an output light connector 105. During operation of normal optical amplification, the optical amplification medium is exited by pump wave that is output from an pump wave source 111. As a result, a gain of the optical signal is provided. Generally, the optical amplifier 100 is controlled so that output intensity of pump wave is kept constant, or so that output light intensity of the optical amplifier 100 is kept constant (constant output control) or so that a signal gain of the optical amplifier 100 is kept constant (constant gain control).

The interrupting mechanism by detecting a loss of an input signal is described as below. A portion (a few percents) of an optical signal, which has been input via the input light connector 101, is branched by optical branch unit 102, and then photoelectrically converted by an input light detector 109. When photoelectric current detected by the input-light detector 109 becomes lower than or equal to a given level, a control circuit 110 judges that input light is lost. Accordingly, the control circuit 110 controls driving current of an pump wave source 111, which reduces or interrupts pump wave supplied to the optical amplification medium 103 to decrease a gain of the optical amplifier. The above-mentioned given level is generally set to a level such as an intermediate level between the minimum signal input level (that is determined by a signal-to-noise ratio of an optical signal and a configuration of a transmission system) and a noise level.

In addition, the optical amplifier, for which an input signal has been lost, outputs broadband noise light called ASE (Amplified Spontaneous Emission) instead of amplifying the signal light. The noise light may cause a bad effect including malfunction of: an input signal detecting circuit of an optical amplifier that follows; an amplifier with constant gain control; and an amplifier with constant output control. Because of it, the optical amplifier may be interrupted in order to avoid the bad effect.

The interrupting mechanism by detecting open of an output is described as below. An optical branch unit 104 is located at an output end of the optical amplifier 100. Optical signal 112 is branched from the optical branch unit 104 and is output to an optical fiber transmission line. Another branched light is introduced into an output-light detector 107. In addition to it, the optical branch unit 104 branches a portion (a few percents) of reflected light 113, which is input via the light connector 105, in reverse direction to introduce it into a reflected-light detector 108. Those signal intensities are photoelectrically converted and then are input to the control circuit 110. When a ratio of reflected light intensity to output light intensity exceeds a given level, the control circuit 110 judges that the output end is open. Accordingly, the control circuit 110 controls driving current of the pump wave source 111, which reduces or interrupts pump wave supplied to the optical amplification medium 103 to decrease a gain of the optical amplifier. The above-mentioned given level is generally set to a level intermediate between a Fresnel reflection level, which occurs when a connector is opened or a fiber is cut, and a reflection level of an optical signal caused by Rayleigh scattering produced in an optical fiber transmission line (in ordinary cases, the former is larger).

SUMMARY OF THE INVENTION

The object of the present invention is to provide an optical amplifier that does not malfunction even when intense pump wave is used. In addition, the present invention provides a Raman amplifier that does not malfunction even when intense pump wave is used.

Moreover, the present invention provides an optical transmission device or an optical transmission system, which does not malfunction even when intense pump wave is used.

Main technical objectives of the present invention are described as below.

A first technical objective is to detect a loss of an input signal, which is input to an optical amplifier, with a high degree of accuracy in order to interrupt the optical amplifier or decrease an output of the optical amplifier even when intense pump wave is used. This accurate operation of the optical amplifier can prevent light surge at the time of light re-incidence from occurring.

A second technical objective of the present invention is to detect open of an output signal from the optical amplifier, with a high degree of accuracy in order to interrupt the optical amplifier or decrease an output of the optical amplifier even when intense pump wave is used. This accurate operation of the optical amplifier can prevent undesired light from being emitted.

A preferred object of the present invention is to provide an optical amplifier that achieves both of the first and second technical objectives. In addition, the optical amplifier according to the present invention provides an optical transmission device or an optical system, which does not malfunction.

The present invention is broadly divided into three fundamental modes.

A first mode of the present invention is a mode that uses a means for eliminating pump wave, and an elimination member (for example, a filter). Although various embodiments can be considered as the first mode, an example of a typical embodiment is that an elimination filter for pump wave is inserted into an input detection circuit and an output detection circuit of an optical amplifier. Applying the means for eliminating pump wave to both of the input detection circuit and the output detection circuit enables us to achieve both of the first and second technical objectives. When trying to detect reflected light from an output end of Raman pump wave, it is useful to apply a similar means for eliminating pump wave to a line leading to a photoreceptor for this reflected light.

As a means for eliminating pump wave, not only a filter but also for example a wavelength multiplexer and the like can be used. In this case, needless to say, the wavelength multiplexer has characteristics of eliminating pump wave (for example, Raman light) while passing desired signal light.

It is preferable that the wavelength multiplexer has Raman pump wave transmittance at a level that reduces intensity of Raman pump wave arriving at a light detector to less than or equal to half of optical-signal intensity to be detected.

A second mode of the present invention is a mode that changes detecting threshold values of the input and output detection circuits in response to a condition of pump wave such as ON/OFF of pump wave. Applying a means for changing detecting threshold values to both of the input detection circuit and the output detection circuit enables us to achieve both of the first and second technical objectives.

A third mode of the present invention is a mode that adjusts intensity of pump wave itself. A typical embodiment of the third mode uses pump wave to detect presence or absence of opened input/output.

Moreover, in addition to those fundamental modes, it is possible to use a method for starting pump wave and a method for transferring monitored-information using backward-direction pump wave in combination with those modes. The combined use is useful for achieving the objects of the present invention.

DESCRIPTION OF THE INVENTION

Figure 1:
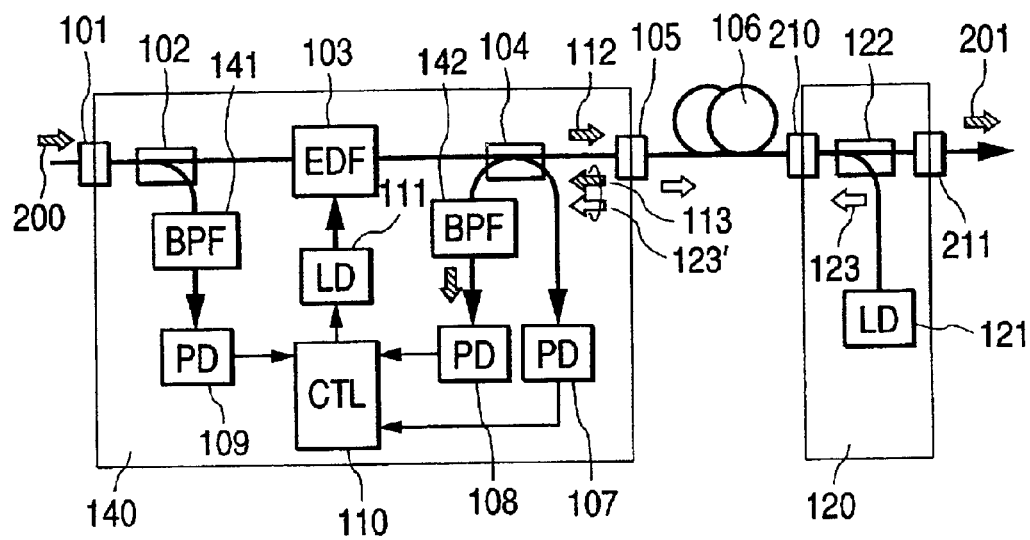
FIG. 1 is a configuration diagram illustrating a first embodiment of the present invention.

Based on the three fundamental modes mentioned above, embodiments of the present invention are described in detail as below.

In this connection, a device and an optical system, which are objects of the present invention, relate to an optical device or an optical system that uses intense pump wave, for example, more intense pump wave than signal light. A typical example of this intense pump wave is Raman light. However, because there are various kinds of optical devices, their members, optical systems, and the like to which the present invention can be applied, only main items from among them are listed and exemplified here. If invention concepts disclosed in this application can be applied to optical devices or optical systems other than those listed specifically here, they are of course covered by the present invention.

(1) As an optical amplifier, there are an optical fiber amplifier, a semiconductor optical amplifier, an optical fiber Raman amplifier, a lumped Raman amplifier, and others. In this case, the optical fiber Raman amplifier introduces Raman light into an optical transmission line and an optical fiber, and then performs optical amplification by stimulated Raman effect in the optical transmission line and the optical fiber. In specification of this application, a means or a device for introducing this Raman light into an optical transmission line and an optical fiber is called an optical fiber Raman amplifier.

(2) Pump wave source for an optical fiber Raman amplifier.

(3) Various kinds of optical amplifiers or optical systems, in which optical fiber Raman amplifiers are connected in a cascade form.

(4) An optical amplifier to which Raman pump wave is input. For example, an optical amplifier comprising an input portion of pump wave for an optical fiber Raman amplifier.

(5) An optical device, an optical transmission device, and an optical repeater that comprise each of the optical amplifiers mentioned above.

(6) An optical system comprising an optical device, an optical transmission device, an optical repeater, and the like that use each of the optical amplifiers mentioned above.

A first fundamental technical concept of the present invention is a mode that inserts an optical filter between a light detector for detecting intensity of reflected light from an output end of an optical amplifier's optical signal and the output end. The optical filter blocks a wavelength of pump wave used in optical fiber Raman amplification and allows a wavelength of this optical signal to pass through the optical filter. This eliminates disturbance to the light detector caused by the Raman pump wave. In addition, inserting an optical filter, which blocks a wavelength of pump wave used in optical fiber Raman amplification and allows a wavelength of the optical signal to pass through the optical filter, between a light detector for detecting intensity of an input signal from an input end of the optical signal and the input end can be applied to input detection in a similar manner.

There is also a means for preventing the Raman pump wave from being mixed, such as the following: a method that uses a wavelength multiplexer to block a wavelength of pump wave used in optical fiber Raman amplification and to allow a wavelength of the optical signal to pass through the wavelength multiplexer. To be more specific, an input portion or an output portion of an optical signal, or both of them, are provided with a wavelength multiplexer that mixes pump wave for optical fiber Raman amplification toward an optical fiber transmission line. Locating this wavelength multiplexer between a light detector for detecting intensity of an input signal from an optical signal's input end and the input end permits a wavelength component of the pump wave to be eliminated. In addition, locating this wavelength multiplexer between a light detector for detecting intensity of reflected light from an optical signal's output end and the output end, or locating the wavelength multiplexer at both of the locations, also permits a wavelength component of the pump wave to be eliminated by the wavelength multiplexer in a similar manner. In this case, the wavelength multiplexer has similar characteristics to the optical filter that blocks a wavelength of pump wave used in the optical fiber Raman amplification and that allows a wavelength of the optical signal to pass through the optical filter. Accordingly, the wavelength multiplexer performs the same function as that of the optical filter.

The means for eliminating a wavelength component of pump wave described above is particularly effective for an optical fiber Raman amplifier that uses an optical fiber transmission line as a gain medium, or for an pump wave source for an optical fiber Raman amplification. Additionally, the means is also effective for an optical amplifier having an input portion of pump wave for an optical fiber Raman amplification. Moreover, the means is also effective for an optical transmission device and an optical transmission system that comprise the optical fiber Raman amplifier, the pump wave source for an optical fiber Raman amplification, or the optical amplifier having an input portion of pump wave for an optical fiber Raman amplification.

A second technical concept of the present invention is a mode that changes detecting threshold values of input and output detection circuits in response to a condition of pump wave such as ON/OFF of pump wave.

In other words, reflection intensity or incident intensity of signal light changes in response to ON/OFF condition of an optical fiber Raman amplifier and output intensity of pump wave. Therefore, by changing a judgment threshold value for input detection or output reflected-light detection to a plurality of different values in response to it, it becomes possible to reduce an effect of noise light and to detect input light or reflected light with higher reliability. For example, operation is specifically exemplified as follows: if an ON/OFF signal of Raman pump wave is ON, a system uses a large voltage value for reference power supply; and if the ON/OFF signal of the Raman pump wave is OFF, the system uses a small voltage 115 value. As a result, malfunction of the optical device and the optical system can be prevented.

A third technical concept of the present invention is a mode that adjusts intensity of pump wave itself (for example, a mode that uses pump wave itself for detecting input/output's open. More specifically, because an pump wave source device for Raman amplification and an optical fiber Raman amplifier also output light with high intensity, the objects of the present invention can be achieved if a light detector for measuring intensity of reflected light from an output end or a ratio of intensity of reflected light from the output end to intensity of output light is provided. The pump wave is adjusted according to a result of detection by this light detector.

An example of this adjustment is described as follows: intensity of pump wave is detected; and if an optical signal level is higher than or equal to a given level, it can be shown that there is no opened connector on an upstream side of the light source device. Accordingly, pump wave is lit to transmit the pump wave to the upstream side. On the other hand, if the input signal light described above becomes lower than or equal to the given level, it is judged that open of a connector or the like has occurred, and thereby Raman pump wave is interrupted. This threshold value is not necessarily required to be changed between two values (ON/OFF). The threshold value may be changed consecutively or among three values or more.

In this case, locating an optical filter, which allows a wavelength of pump wave to pass through the optical filter and blocks a wavelength of signal light to be amplified and other disturbance light, between the light detector and an output end eliminates an effect of the disturbance light, and thereby permits input/output's open to be detected with a higher degree of accuracy. This can also be achieved by locating the light detector between a wavelength multiplexer, which mixes pump wave and signal light to be amplified, and an pump wave source.

In addition, when intensity of reflected light from the output end or a ratio of intensity of reflected light from the output end to intensity of output light exceeds a specified value, it is possible to ensure higher safety of the device by: reducing or interrupting pump wave; displaying an alarm; or transferring an alarm and monitoring information to other devices.

Next, it is also possible to device a method for starting pump waves up from a Raman light source. To be more specific, when starting a pump wave up, the pump wave is lit with low intensity in advance while measuring intensity of reflected light from the output end or a ratio of intensity of reflected light from the output end to intensity of output light. When a measured value exceeds a given value, the following actions are taken: intensity of the pump wave is fixed, reduced, or interrupted; an alarm is displayed; or an alarm and monitoring information is transferred to other devices. On the other hand, when the measured value is smaller than or equal to the given value, intensity of the pump wave is increased to a predetermined value. Such method for starting pump waves provides a method required when pump waves are desired to be started more safely and reliably.

In particular, regarding an optical fiber Raman amplifier, using the input detection and the reflection detection at a wavelength of a light signal to be amplified in combination with the input detection and the reflection detection at a wavelength of pump wave ensures more reliable detection of input/output's open.

Next, a method that uses reverse-direction pump wave (backward-pump) is described. As regards a backward-pump type optical fiber Raman amplifier located on a downstream side of an optical fiber transmission line, modulating Raman pump wave, which travels in a direction opposite to that of a signal light, using a frequency ac or more (where a is a loss coefficient of an optical fiber transmission line at an pump wave source, and c is velocity of light) to detect the modulated component eliminates an effect of the disturbance light in detecting input/output's open using the Raman pump wave, and at the same time prevents transmission characteristics of the signal light from being degraded.

In addition, it becomes possible to make a distinction between a Rayleigh scattering component and a Fresnel reflection component at a connector end, which enables more reliable judgment of input/output's open. Said modulated component is also used for detecting a condition of input/output's open of an optical transmission device on the upstream side, and for transmitting information to the optical transmission device on the upstream side, in combination.

In this connection, if a similar technology is applied to a forward-direction pump type optical fiber Raman amplifier located on an upstream side of an optical fiber transmission line, decreasing modulation amplitude sufficiently minimizes degradation of a transmission signal, which enables us to achieve similar objectives to those described above.

Additionally, regarding an optical amplifier located on an upstream side of an optical fiber transmission line, a method for starting and interrupting pump wave more safely and reliably can be obtained by the following: measuring pump wave intensity of a Raman amplifier located on a downstream side of an optical fiber transmission line; when the measured light intensity is within a range of predefined light intensity, a light signal output is increased or kept constant, or the pump wave of the Raman amplifier is lit, increased, or kept constant; and when the measured light intensity is out of the range, the light signal output or the pump wave of the Raman amplifier is decreased or interrupted. This is also applicable even if the optical amplifier on the upstream side is an optical fiber Raman amplifier. In this connection, higher safety is secured when excitation intensity of Raman pump wave transmitted from the downstream side is in a reduced condition at the time of starting.

Moreover, regarding an optical fiber Raman amplifier located on a downstream side of an optical fiber transmission line, a method for starting and interrupting pump wave safely can be obtained in a similar manner by the following: measuring intensity of signal light or Raman pump wave transmitted from an upstream side; when the measured light intensity is within a range of predefined light intensity, the Raman pump wave is lit, increased, or kept constant; and when the measured light intensity is out of the range, the light signal output is decreased or interrupted.

Consideration of Problems Underlying the Present Invention

Before exemplifying embodiments of the present invention specifically, study, consideration, and the like made by inventors who have come to submit the present invention are described.

As roughly described in the above-mentioned related art, the purpose of detecting a loss of an input signal and interrupting an optical amplifier is mainly to prevent light surge from occurring.

As regards an optical amplifier that uses inverted population such as EDFA (Erbium-doped Fiber Amplifier), when an input signal is lost, an upper level carrier in the EDFA is not consumed causing a gain of the optical signal to be kept at its maximum. If an optical signal is input to the optical amplifier in this condition again, a rising portion of the optical signal becomes sharp, which may produce an optical pulse with high peak power (light surge). In particular, in multiple-repeat optical transmission for which a plurality of optical amplifiers are connected in a cascade form, every time passing through the optical amplifier, peak power grows larger. This may result in breakage of an optical device (such as an optical receiver connected to a receiving end) and a light connector. For this reason, when the input signal is lost, pump wave and excitation current of the optical amplifier may be reduced or interrupted to prevent light surge from occurring.

In addition, as described above, the purposes of detecting output's open and interrupting an optical amplifier are to protect an operator, to prevent a connector from being burnt, and others. This interruption is particularly important because output signal intensity of an optical amplifier reaches a few 100 mW in recent wavelength-division-multiplexing transmission. By the way, output's open means open of a connector, cut of a fiber, and the like. Additionally, other effects can also be obtained: preventing light surge that occurs when a portion of an opened output (hereinafter referred to as 'output-open point') is connected again; and others.

However, as a result of studying various cases where a conventional optical amplifier and a Raman amplifier are used in combination, the inventors of this application have found out that although the effects described above will be produced, there are problems as described below. Taking such problems into consideration, the present inventions are provided.

Regarding such conventional optical amplifier, if it is used in combination with a Raman amplifier, that is to say, if intense pump wave is used, an interrupting mechanism of the conventional optical amplifier may not work normally. There are two main reasons:

(1) A Raman amplifier, which uses an optical fiber transmission line as a gain medium, inputs intense Raman pump wave to the optical fiber transmission line. Because of it, this pump wave causes malfunction of the above-mentioned input detection or output-open detection, or the like, which is used in the conventional optical amplifier such as EDFA.

(2) In addition, presence or absence of the Raman pump wave may produce a signal gain leading to a change of signal intensity itself. This causes the optical amplifier to malfunction.

Those problems are attributed to specificity derived from using intense pump wave. Allowing for conventional technologies shown in FIGS. 2 and 3, this specificity is considered.

A first point of the problem is as follows: when using intense pump wave, reflected-light intensity of signal light becomes almost equal to remaining intensity of pump wave; and as a result, connector's open can not be detected normally.

Figure 2:
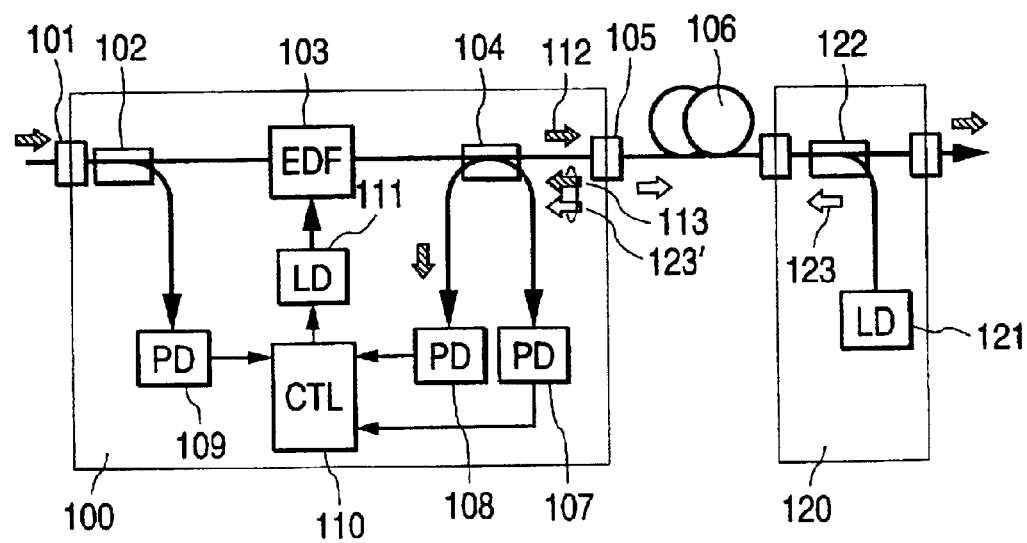
FIG. 2 is a configuration diagram illustrating a conventional optical amplifier.

The problem is described with reference to FIG. 2. For example, as shown in FIG. 2, optical fiber Raman amplifier 120 is connected to a downstream side of optical amplifier 100 through optical fiber transmission line 106. In the optical fiber Raman amplifier 120, light from pump wave source 121 is wavelength-mixed through wavelength multiplexer 122, and pump wave 123 that is output from the pump wave source 121 is introduced into optical fiber transmission line 106. The pump wave 123 is non-modulated light, of which wavelength is shorter than that of a signal light by about 100 nm, and travels in a direction opposite to that of the signal light. Therefore, in the optical fiber transmission line 106, the signal light is amplified by stimulated Raman effect.

In this connection, as described above, Raman amplification is actually performed in an optical fiber transmission line. In specification of this application, however, a device having a function of mixing signal light and Raman pump wave is called optical fiber Raman amplifier. In addition, black arrows (such as 112) show an optical signal or a reflected component of the optical signal. On the other hand, outline arrows (such as 123) show Raman pump wave or its reflected component. Moreover, a wavelength multiplexer and a splitter are elements that have a function of mixing and splitting light with a low loss using a wavelength difference between pump wave and signal light.

Although the optical fiber transmission line 106 produces a loss of the pump wave 123, a portion of the pump wave 123 reaches connector 105, and then reaches reflected-light detector 108 together with reflected light 113. For example, supposing that an output level of pump wave is 25 dBm and a loss of the optical fiber transmission line is 30 dB, intensity of light that is input to the output connector 105 is −5 dBm. On the other hand, supposing that a signal light output of the optical amplifier 100 is 10 dBm and a Fresnel reflection rate of the signal light is −14 dB, intensity of Fresnel reflection light becomes almost equal to remaining intensity of the pump wave. As a result, a problem arises: connector's open can not be detected normally.

Next, a second point of the problem is that when using a Raman amplifier and other optical amplifiers connected one another in a cascade form, input signal detection or output-open detection becomes difficult for both of the conventional optical amplifier and the Raman amplifier.

Figure 3:
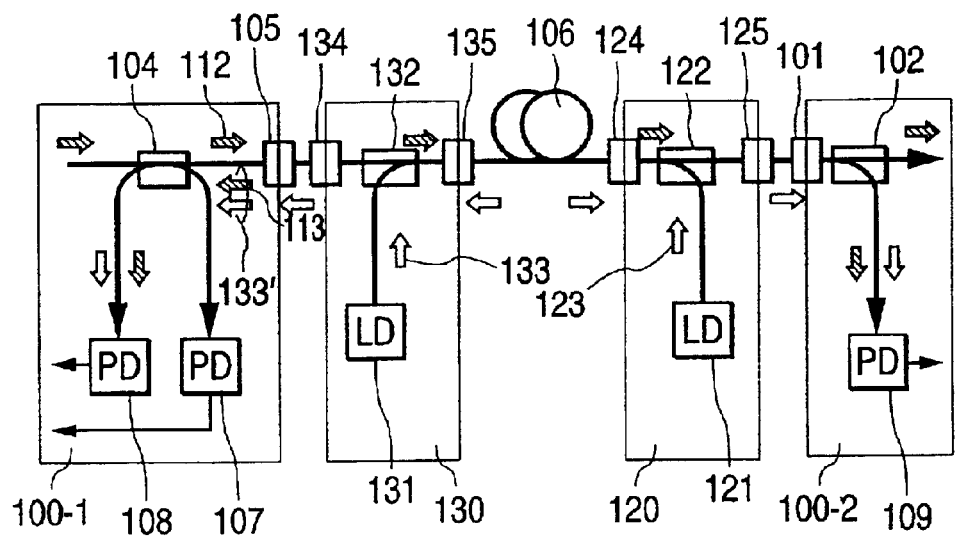
FIG. 3 is a configuration diagram illustrating a conventional optical amplifier.

An embodiment shown in FIG. 3 is considered as below. FIG. 3 shows an example, in which optical amplifier 100-1 and optical fiber Raman amplifier (forward-pump type) 130 are located on an upstream side of optical fiber transmission line 106 and optical fiber Raman amplifier (backward-pump type) 120 and optical fiber amplifier 100-2 are located on a downstream side.

For example, originally, reflected-light detector 108 ought to detect reflected light 113 that has arisen at light connectors 105, 134, 135, and others. However, Rayleigh scattered light of Raman pump wave 133, and remaining light 133' of Raman pump wave 123 from the downstream side may pass through wavelength multiplexer 132 and leak into the reflected light 113. As the wavelength multiplexer 132, a wavelength multiplexer with a wavelength separation degree of about from 30 to 40 dB is used. However, because light intensity of Raman pump wave is extremely high, it may cause the reflected-light detector 108 to malfunction in a case where a number of wavelengths in a light signal is small and light signal intensity is low, and in other cases. In addition, as one of Raman amplification methods, a method, which locates an pump wave reflection grating at some midpoint of the optical fiber transmission line 106 to reflect pump wave, is known. In such case, malfunction tends to occur because a reflection rate of the pump wave becomes larger.

In addition, it is worth considering that the optical fiber Raman amplifiers 130, 120 are also provided with circuits for input detection and output-open detection, although they are omitted in each diagram described above. However, those circuits may malfunction similarly due to the Raman optical amplifier on the other side.

Moreover, input detection circuit 109 of optical amplifier 100-2 may also malfunction similarly due to Raman pump wave.

A threshold value, which is used to judge presence or absence of an input signal, at the input detection circuit 109 is low (normally from −20 to −40 dBm) although the value is determined depending on a system configuration. Because of it, even if a wavelength separation degree at the wavelength multiplexer 122 is high, possibility of malfunction caused by reflection and a remaining component of pump wave becomes higher. In particular, if the optical fiber Raman amplifier 120 is not used, the problem becomes serious.

Additionally, if the optical fiber Raman amplifier is used, ON/OFF conditions of Raman excitation sources 131, 121 vary a signal light level, which may lead to malfunction.

Main Modes for Carrying out the Invention

Based on the consideration given by the inventors of this application, this application provides new inventions in relation to the following: a method for detecting input and a method for detecting output's open—for an optical amplifier (as a precaution, it should be noted that the optical amplifier here includes said Raman amplifier); and a method for starting and interrupting the optical amplifier, in which specificity of the Raman amplifier is taken into consideration.

Because the present invention covers a wide range, only main aspects are listed as below.

According to a first aspect of the present invention, there is provided an optical amplifier that amplifies a single wavelength optical signal or a wavelength-division-multiplexed optical signal, said optical amplifier is characterized in that an optical filter, which blocks a wavelength of pump wave used in optical fiber Raman amplification and allows a wavelength of this optical signal to pass through the optical filter, is inserted between a light detector for detecting intensity of reflected light from an optical signal's output end and the output end.

As a member for eliminating Raman pump wave, any optical filter such as a dielectric multilayer film, an optical fiber grating, and a glass waveguide can be used if it has a function of passing signal light through and eliminating Raman pump wave. Although the member for eliminating Raman pump wave is treated as an individual part, such function of the member may be included in a portion of another part as long as the same function is provided. This point is also applied to examples described below in the same manner.

According to a second aspect of the present invention, there is provided an optical amplifier that amplifies a single wavelength optical signal or a wavelength-division-multiplexed optical signal, said optical amplifier is characterized in that an optical filter, which blocks a wavelength of pump wave used in optical fiber Raman amplification and allows a wavelength of this optical signal to pass through the optical filter, is inserted between a light detector for detecting intensity of an input signal from an optical signal's input end and the input end.

According to a third aspect of the present invention, there is provided an optical amplifier that amplifies a single wavelength optical signal or a wavelength-division-multiplexed optical signal, said optical amplifier is characterized in that an input portion or an output portion of an optical signal, or both of them, are provided with a wavelength multiplexer that mixes pump wave for optical fiber Raman amplification toward an optical fiber transmission line;

said wavelength multiplexer is located between a light detector for detecting intensity of an input signal from an optical signal's input end and the input end; or said wavelength multiplexer is located between a light detector for detecting intensity of reflected light from an optical signal's output end and the output end; or said wavelength multiplexer is located at both of the locations.

According to a fourth aspect of the present invention, there are provided an optical amplifier, an optical transmission device, and an optical transmission system that include said optical amplifier of the first, the second, or the third aspect, said optical amplifier, optical transmission device, and optical transmission system comprise:

an optical fiber Raman amplifier that uses an optical fiber transmission line as a gain media, or an pump wave source for an optical fiber Raman amplification, or an input portion of pump wave for an optical fiber Raman amplification.

According to a fifth aspect of the present invention, there are provided an optical amplifier, an optical transmission device, and an optical transmission system that include the first, the second, the third, or the fourth aspects, said optical amplifier, optical transmission device, and optical transmission system are characterized in that a judgment threshold value for input detection or output reflected-light detection is changed to a plurality of different values in response to ON/OFF condition of an optical fiber Raman amplifier and output intensity of pump wave.

According to a sixth aspect of the present invention, there is provided an pump wave source device that transmits pump wave for Raman amplification, or an optical fiber Raman amplifier that transmits pump wave for Raman amplification to an optical fiber transmission line, said pump wave source device or optical fiber Raman amplifier comprises:

a light detector for detecting intensity of reflected light from an pump wave's output end or a ratio of intensity of reflected light from the pump wave's output end to intensity of output light.

According to a seventh aspect of the present invention, there is provided an pump wave source device or an optical fiber Raman amplifier that includes said sixth aspect, said pump wave source device or optical fiber Raman amplifier is characterized in that:

an optical filter, which allows a wavelength of this pump wave to pass through the optical filter and blocks a wavelength of a signal light to be amplified or wavelengths of pump wave of the other optical fiber Raman amplifiers or other disturbance light, is located between a light detector for detecting intensity of reflected light from an pump wave's output end (or a light detector for detecting intensity of output light) and the pump wave's output end; or the light detector for detecting intensity of reflected light or the light detector for detecting intensity of output light, or both of them, are located between a wavelength multiplexer, which mixes this pump wave and the signal light to be amplified, and an pump wave source.

According to an eighth aspect of the present invention, there is provided an pump wave source device or an optical fiber Raman amplifier that includes said sixth or seventh aspect, said pump wave source device or optical fiber Raman amplifier is characterized in that:

when intensity of reflected light from an output end or a ratio of intensity of reflected light from the output end to intensity of output light exceeds a specified value, the following are performed: reducing or interrupting pump wave; displaying an alarm; or transferring an alarm and monitoring information to other devices.

According to a ninth aspect of the present invention, there is provided an pump wave source device or an optical fiber Raman amplifier that includes said sixth, seventh, or eighth aspect, said pump wave source device or optical fiber Raman amplifier is characterized in that:

when starting pump wave, the pump wave is lit with low intensity in advance while measuring intensity of reflected light from an output end or a ratio of intensity of reflected light from the output end to intensity of output light; when the measured value exceeds a given value, the following are performed: the pump wave is fixed, reduced, or interrupted; an alarm is displayed; or an alarm and monitoring information is transferred to other devices; and when the measured value is smaller than or equal to the given value, intensity of the excitation value is increased to a predetermined value.

According to a tenth aspect of the present invention, there is provided an optical fiber Raman amplifier that includes said sixth, seventh, eighth, or ninth aspect, said optical fiber Raman amplifier comprises:

input detection of a light signal wavelength or reflected-light detection, or both of them, which are according to said first, second, third, fourth, or fifth aspect.

According to an eleventh aspect of the present invention, there is provided an optical fiber Raman amplifier that is located on a downstream side of an optical fiber transmission line, and that transmits pump wave toward an upstream side of an optical fiber transmission line to amplify an optical signal, said optical fiber Raman amplifier is characterized in that:

an pump wave source is intensity-modulated using a frequency ac or more (where a is a loss coefficient of an optical fiber transmission line at an pump wave source, and c is velocity of light).

According to a twelfth aspect of the present invention, there is provided an optical fiber Raman amplifier or an optical transmission device that includes said eleventh aspect, said optical fiber Raman amplifier or optical transmission device is characterized in that:

a modulated component is used for detecting input/output's open of the optical fiber Raman amplifier or the optical transmission device located on an upstream side; or information is transferred to the optical transmission device located on the upstream side.

According to a thirteenth aspect of the present invention, there is provided an optical fiber Raman amplifier or an optical transmission device that is located on a downstream side of an optical fiber transmission line, and that transmits pump wave toward the downstream side of an optical fiber transmission line to amplify an optical signal, said optical fiber Raman amplifier or optical transmission device is characterized in that:

an pump wave source is small-signal intensity-modulated using a frequency ac or more (where a is a loss coefficient of an optical fiber transmission line at an pump wave source, and c is velocity of light); and said modulated component is detected to detect a condition of output's open, or an optical transmission device located on the downstream side is used for input's open detection.

According to a fourteenth aspect of the present invention, there is provided an optical amplifier that is located on an upstream side of an optical signal transmission direction of an optical fiber transmission line, said optical amplifier is characterized in that: pump wave intensity of a Raman amplifier located on a downstream side of an optical fiber transmission line is measured;

when the measured light intensity is within a range of predetermined light intensity, a light signal output is increased or kept constant, or the pump wave of the Raman amplifier is lit, increased, or kept constant; and when the measured light intensity is out of the range, the light signal output or the pump wave of the Raman amplifier is decreased or interrupted.

According to a fifteenth aspect of the present invention, there is provided an optical fiber Raman amplifier that is located on a downstream side of an optical fiber transmission line, said optical fiber Raman amplifier is characterized in that:

intensity of signal light or Raman pump wave transmitted from an upstream side is measured;

when the measured light intensity is within a range of predetermined light intensity, the Raman pump wave is lit, increased, or kept constant; and when the measured light intensity is out of the range, the light signal output is decreased or interrupted.

Preferred Embodiments

A first embodiment is an example of a mode that uses a filter for eliminating pump wave. FIG. 1 is a configuration diagram illustrating a first embodiment of the present invention. In particular, this example shows a configuration example of an optical amplifier 140 according to the present invention. To be more specific, in the present invention, the optical amplifier 140 is connected to an optical fiber Raman amplifier 120, which generates pump wave, through an optical fiber transmission line 106. By the way, abbreviations used in diagrams are outlined as below. All of the diagrams use those abbreviations identically in meaning. LD is an abbreviation of 'Laser Diode'. Likewise, PD is 'Photo Diode'; CTL or CTRL is 'Control Circuit'; EDF is 'Erbium Doped Fiber'; and BPF is 'Band-Pass Filter'.

Signal light 200 is amplified by the optical amplifier 140, and then amplified again in the optical fiber transmission line 106 by Raman pump wave 123 from the optical fiber Raman amplifier 120. After that, this amplified signal light 201 is output from the output end 211 of the optical fiber Raman amplifier 120.

An optical branch unit 102 is located on an input side of an optical amplification medium 103. Branched light of the signal light 200 is input to an input-light detector 109 that detects input light. A result of detection by the input-light detector 109 is transmitted to a control circuit 110, where the result is used to control an output of an pump wave source 111 and the like. On the other hand, an optical branch unit 104 is located on an output side of the optical amplification medium 103. The optical branch unit 104 transmits an optical signal to output end 105. At the same time, light branched by the optical branch unit 104 is input to an output-light detector 107. A light branch ratio is a few percents, for example, about 1 to 10%. A result of detection by the input-light detector 107 is transmitted to the control circuit 110, where the result is used to control an output of the pump wave source 111 and the like. In addition, reflected light 113 from the output end 105 is input to a reflected-light detector 108. A result of detection by the input-light detector 108 is transmitted to the control circuit 110, where the result is used to control an output of the pump wave source 111 and the like. In this manner, the optical amplifier 140 is provided with the following desired control: keeping output intensity of pump wave constant; or keeping output intensity of the optical amplifier 140 constant; or controlling a signal gain of the optical amplifier 140 so that the gain is kept constant. By the way, an example of the control circuit 110 is described later. However, detail description of the control is omitted here because a general method may be appropriately applied to general control of such control system.

Features of the present invention are described as below. The optical amplifier 140 amplifies the optical signal 200, which has been input from the input light connector 101, in the optical amplification medium 103. Then, the optical amplifier outputs the signal to the optical fiber transmission line 106 via the output light connector 105. As a next stage, the optical fiber Raman amplifier 120 is connected to this output light connector 105. Accordingly, although the optical signal 112 reaches the output light connector 105, reflected light 113 is generated. Filter for eliminating Raman pump wave (hereinafter, referred to as 'Raman pump wave elimination filter') 142 is located immediately before the reflected-light detector 108 to eliminate remaining Raman pump wave 123' that has leaked into the reflected light 113.

This Raman pump wave elimination filter 142 has the following functions: passing an optical signal having a wavelength, which should be amplified by the optical amplifier 140, through the filter; and eliminating Raman exciting light. Therefore, even if the Raman amplifier 120 is used, it is possible to measure intensity of the reflected-light 113 of the signal light 112 with accuracy to detect output's open correctly. In this connection, a wavelength of pump wave used for Raman amplification is normally shorter than a signal wavelength by about 100 nm. Because of it, both of them can be easily separated by a wavelength filtering. For example, if a wavelength of an optical signal is 1550 nm, a wavelength of Raman pump wave is about 1450 nm. In addition, even if the Raman amplifier is not used, no effect will be exercised on operation as a normal optical amplifier.

In this example, another filter (Raman pump wave elimination filter 141) is located between the input-light detector 109 and the input connector 101. In this embodiment, only the signal, which is backward-pumped from a downstream side of an optical fiber, is specifically described. However, in a similar manner, if an optical filter for eliminating Raman pump wave is inserted into an input-light detecting portion, a reflected-light detecting portion, and the like in advance, there is the following advantage: sharing the same amplifier is allowed in future when an optical fiber Raman amplifier is used, or even when a different configuration is used.

In this embodiment, although the example that includes functions of both input-light detection and reflected-light detection is shown, the present invention can be applied to even a case, where either of the functions is provided, without problems. In addition, because requirements of the input-light detection and the reflected-light detection are different depending on a system type, or the like, the present invention may be applied to only either of them according to system's specifications.

In this connection, in a case where a broadband wavelength-division-multiplexing signal is amplified, a wavelength-division-multiplexed optical signal with a plurality of signal wavelengths, and also an pump wave source that is wavelength-division-multiplexed from a plurality of pump wave with a different wavelength may be used. The present invention can also be applied to such case without problems.

The gain medium 103 can be applied to any type of optical amplifier so long as it is one of the following: a 1550 nm-band EDFA that is most broadly used; a long-wavelength band EDFA such as 1580 nm band; an optical fiber amplifier using a different wavelength such as 1.3 $\mu$m; a semiconductor optical amplifier; a lumped Raman amplifier using a high nonlinear fiber; or an optical amplifier having a function of detecting input light and reflected light. By the way, regarding an optical fiber Raman amplifier that uses an optical fiber transmission line itself as a gain medium, an embodiment in which its specificity is taken into consideration is separately described.

Additionally, as Raman pump wave eliminating filters 141 and 142, any optical filter such as a dielectric multilayer film, an optical fiber grating, and a glass waveguide can be used if it has a function of passing signal light through and eliminating Raman pump wave. Moreover, a wavelength multiplexer, which wavelength-mixes a signal light wavelength and pump wave, can also be used for this purpose.

Because Raman pump wave is extremely intense (generally, a few 100 mW), light intensity to be eliminated by an optical filter may become very high depending on a location of the optical filter. Even in such case, breakage of the filter can be prevented by using an unabsorbent optical filter and by extending a cross section area of an optical signal sufficiently, which presents no problem. In addition, in the present invention, although the Raman pump wave elimination filter is treated as an individual part, such function of the filter may be included in a portion of another part if the same function is provided. As a precaution, it should be noted that the present invention basically includes the following cases: for example, adding a function of blocking a Raman excitation wavelength or an optical filter to a light detector itself; and adding Raman-excitation-wavelength blocking characteristics to an optical branch unit that performs input detection and reflection detection.

Insert positions of the Raman pump wave elimination filters 141 and 142 are not necessarily required to be immediately before the input-light detector 109 and the reflected-light detector 108 if this function is satisfied. For example, the Raman pump wave elimination filters 141 and 142 may be located between the input connector 101 and the optical branch unit 102, between the light branch uni 104 and the output light connector 105, and the like. In this case, although a loss of the signal light increases to some extent, there are the following advantages: Raman pump wave, which has leaked into the optical amplifier, has little effect on the optical amplification medium 103; and the like.

Moreover, regarding a portion treated as a wavelength multiplexer in the present invention, if the portion has a function of mixing pump wave and signal light, a method for mixing light that does not necessarily depend on a wavelength is also applicable. For example, mixing light with a low loss becomes possible in the following methods: using a 1:1-photocoupler type optical branch unit if a loss of about 3 dB is allowed for signal light and pump wave; or using a photo circulator, a polarization beam splitter, or the like if pump wave differs from signal light in traveling direction and polarization. Even in such cases, the present invention becomes applicable unless sufficient separation degrees between pump wave and signal light in the input-light detector and the reflected-light detector can be obtained.

Figure 4:
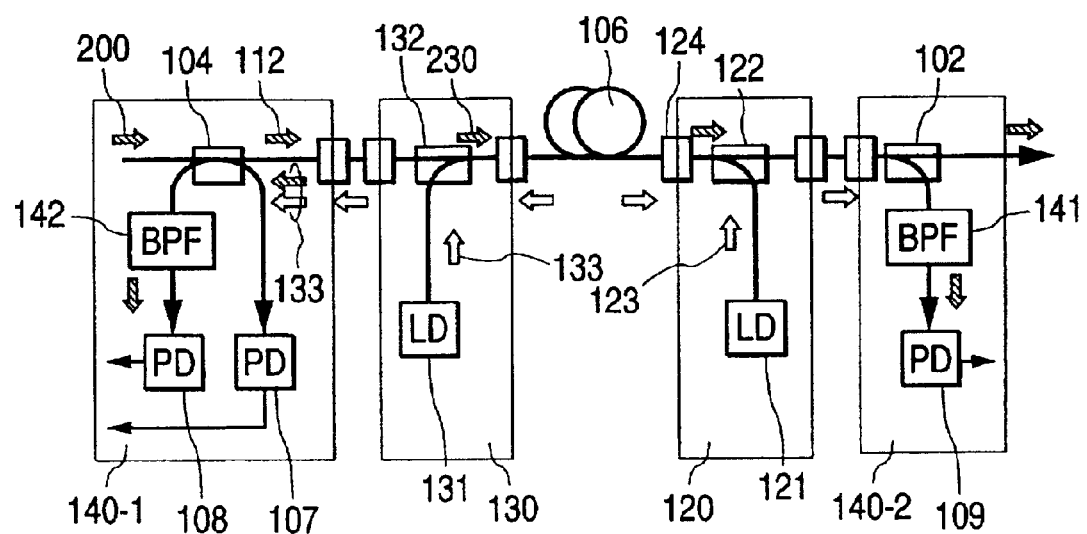
FIG. 4 is a configuration diagram illustrating a second embodiment of the present invention.

Another example that uses an pump wave elimination member is shown as a second embodiment as below. FIG. 4 is a configuration diagram illustrating the second embodiment of the present invention. The diagram shows an example that applies signal light and a forward-pump type optical-fiber Raman amplifier to an upstream side of an optical fiber transmission line, ant that applies signal light and a backward-pump type optical-fiber Raman amplifier to a downstream side.

By the way, FIG. 4 shows only main portions that are directly involved in the present invention. As exemplified in the first embodiment described above, an optical amplifier is provided with the following desired control: keeping output intensity of pump wave constant; or keeping output intensity of an optical amplifier 140 constant; or controlling a signal gain of the optical amplifier 140 so that the gain is kept constant; or the like. Detailed description of those points is omitted. Similarly, in embodiments described below, only main portions directly involved in the present invention are presented.

Optical signal, which has been amplified in an optical amplifier 140-1, is input to optical fiber Raman amplifier 130. The optical signal is mixed with pump wave 133, which has been output from Raman pump wave source 131, by a wavelength multiplexer 132. The optical signal is then input to an optical fiber transmission line 106.

On the other hand, pump wave 123, which has been output from Raman pump wave source 121 in optical fiber Raman amplifier 120, is input to the other end of the optical fiber transmission line 106, in a direction opposite to that of signal light, via a wavelength multiplexer 122. The optical signal, which has passed through the optical fiber Raman amplifier 120, is amplified in an optical amplifier 140-2 furthermore.

In this embodiment, Raman pump wave elimination filters 142 and 141 are inserted immediately before a reflected-light detector 108 of the optical amplifier 140-1 and an input-light detector 109 of the optical amplifier 140-2 respectively for the purpose of preventing an optical-amplifier interrupting circuit from malfunctioning due to Raman pump wave leaking into the detectors. For example, the pump wave elimination filter 141 eliminates a remaining component of the Raman pump wave 133 and a reflected component of the Raman pump wave 123, which have passed through the optical fiber transmission line, from the optical signal leaking into the input-light detector 109.

In this configuration, although the wavelength multiplexer 122 for wavelength-mixing pump wave has an effect of reducing the leakage of pump wave, a reduced value is normally about −30 to −40 dB, which is not always sufficient. For example, supposing that an pump wave output is +25 dBm, a light reflection ratio caused by Rayleigh scattering of the optical fiber transmission line 106 is −24 dB, and an pump wave elimination effect of the wavelength multiplexer is −35 dB, intensity of pump wave that is input to the optical fiber amplifier 100-2 is −34 dBm. This value is, for example, equivalent to receiving sensitivity (an error ratio: $10^{-12}$) of a 10 Gbit/s optical receiver using an optical preamplifier. In a system that uses a system configuration and an error-correcting circuit, this value may approach to an input level of an optical signal itself, which may cause the input-light detection circuit 109 to malfunction if the present invention is not applied to the system. In addition, if the optical fiber Raman amplifier 120 is not equipped with an output-open detection circuit, or if the output-open detection circuit malfunctions, a reflected light with about 10 dB higher intensity is input to the input-light detection circuit 109 when input connector 124 or the like is opened. In either case, absence of a signal light is judged to be existence by mistake, impeding an normal interruption of the optical amplifier 100-2. In the present invention, an pump wave elimination filter reduces an pump wave level by a few 10 dB furthermore, preventing such things from occurring.

Moreover, in the case of a configuration that does not use the optical fiber Raman amplifier 120, a remaining component of the Raman pump wave 133 is input to the optical fiber Raman amplifier 140-2. Even in this case, the pump wave elimination filter 141 can prevent malfunction. Thus, the optical amplifier, to which the present invention is applied, has an advantage that an input detection circuit always operates normally regardless of a system configuration having a different number of Raman amplifiers as well as different locations of them.

As regards all of the embodiments in common, application of the present invention does not necessarily require all of the optical amplifiers and the optical fiber Raman amplifiers shown in the diagrams. The exemplified diagrams exemplify how optical amplifiers and optical fiber Raman amplifiers are connected.

For example, in the second embodiment described above, there may be a case where either the optical amplifier 140-1 or 140-2 does not exist, or there may be a case where either the Raman amplifier 120 or 130 does not exist or both of them do not exit. Moreover, in contrast to such configurations, there may be a configuration in which another optical amplifier is added so as to form multistage connection, or a configuration in which a plurality of optical fiber transmission lines are used for repeated transmission. However, application of the present invention produces no problem. For example, even if there is no Raman amplifier, locating the Raman pump wave elimination filters 141 and 142 in the optical amplifier 140-1 and 140-2 in advance will prevent interruption circuits of the optical amplifier 140-1 and 140-2 from malfunctioning if a Raman amplifier is used in future. Furthermore, this embodiment has an advantage that a device configuration can be integrated and shared.

Figure 5:
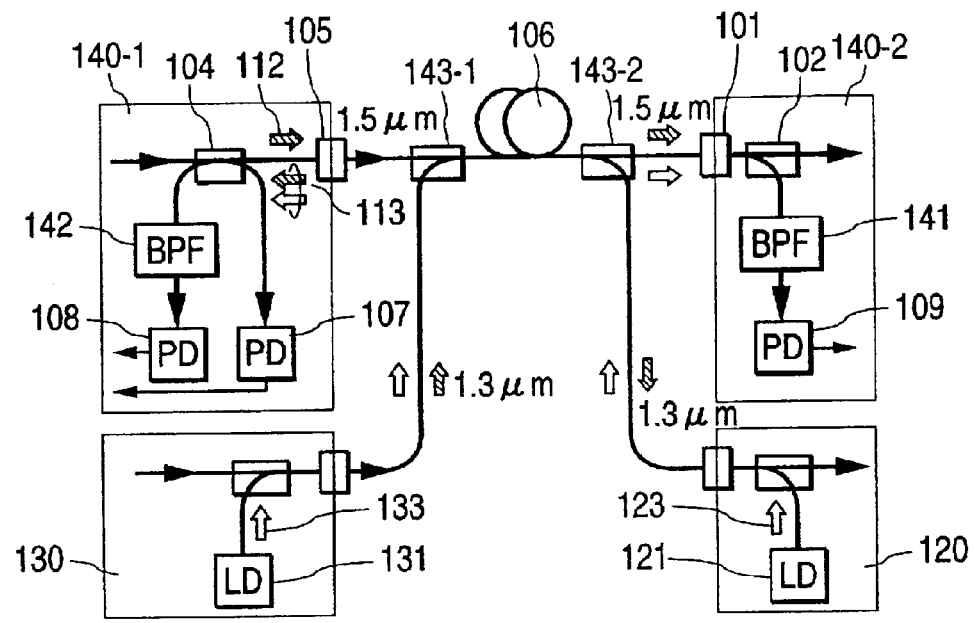
FIG. 5 is a diagram illustrating a third embodiment of the present invention.

A third embodiment is another example that uses an pump wave elimination filter. FIG. 5 shows the third embodiment of the present invention, and illustrates a configuration of an optical transmission system that band-divides a multiband optical signal for transmission.

This embodiment assumes that there are two wavelength bands: a 1.3 μm band and a 1.5 μm band. A 1.5μ-band optical signal is amplified by optical amplifiers 140-1 and 140-2 such as EDFA. A 1.3μ-band optical signal is amplified by optical fiber Raman amplifiers 130 and 120. That is to say, in this case, light is amplified by stimulated Raman effect in an optical fiber 106, and others. Both of the optical signals, which have wavelengths of 1.3 μm and 1.5 μm, are mixed by a wavelength multiplexer and demutiplexer 143-1, are transmitted through the optical fiber transmission line 106, and then are split by a wavelength multiplexer and demutiplexer 143-2 again. A wavelength of pump wave sources 121 and 131, which is used for amplifying the 1.3 μm band, is about 1.2 μm. As is the case with the other embodiments, if wavelength splitting characteristics of the wavelength multiplexer and demutiplexers 143-1 and 143-2 are not designed so that sufficient wavelength-separation characteristics are obtained at the 1.2 μm band, Raman pump wave may have an effect on input light of the optical amplifiers 140-1 and 140-2 and on an output-reflected-light detection circuit. In this embodiment, Raman pump wave elimination filters 142 and 141 for eliminating light with a wavelength of about 1.2 μm are inserted immediately before a reflected light detection circuit 108 and an input-light detection circuit 109 to prevent malfunction from occurring.

In this connection, a combination of wavelength bands and a wavelength band for which Raman amplification is used are not necessarily limited to this example. In FIG. 5, for example, there may be a configuration in which the 1.3 μm band is amplified by a 1.3 μm-band optical fiber amplifier such as PDFA and optical fiber Raman amplifiers are added to before and after the 1.5 μm-band optical amplifier. The present invention can also be applied to such configuration in the same manner. In this case, because a wavelength of Raman pump wave approaches to a midpoint between both of the bands, it becomes difficult to perform sufficient wavelength separation only by the wavelength multiplexer and demutiplexers 143-1 and 143-2. The present invention, therefore, is increasingly required.

The example that uses an pump wave elimination filter is described above. Next, a configuration example of control circuit 110 is described as below. A case where it is applied to the above-mentioned example that uses an pump wave elimination filter is described.

Figure 6:
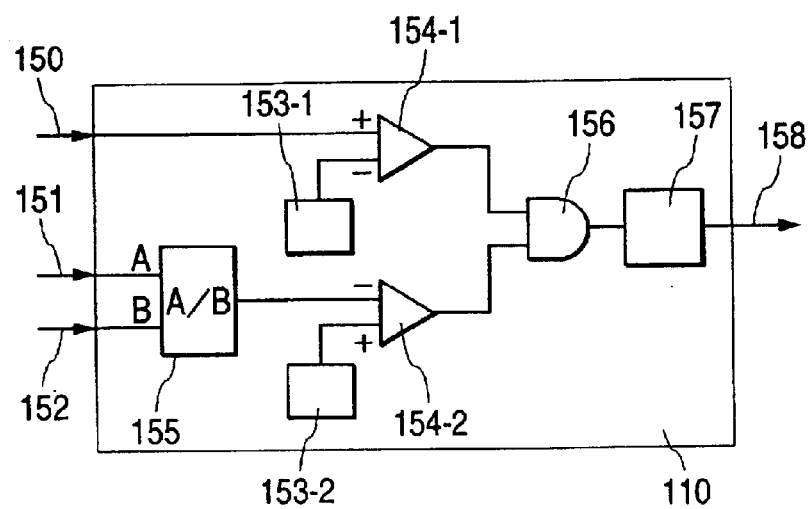
FIG. 6 is a configuration diagram illustrating an embodiment of a control circuit.

FIG. 6 shows an example of the control circuit 110 according to the present invention, which is configured by electronic circuits. The control circuit of this example corresponds to the embodiment shown in FIG. 1. An input-light intensity signal 150, a reflected-light intensity signal 151, and an output-light intensity signal 152 are input to the control circuit. The input-light intensity signal 150 is then input to a comparator 154-1. If this input value is greater than a reference input level that is set to a reference power supply 153-1, in other words, if a signal-light input exists, an output of comparator becomes logical value 1. In addition, the reflected-light intensity signal 151 and the output-light intensity signal 152 are input to a divider 155 to calculate a ratio of the reflected-light intensity signal 151 to the output-light intensity signal 152. This ratio value is input to a comparator 154-2, and then is compared with a reference reflection level that is set to a reference power supply 152. If the ratio of the two is smaller than or equal to a given value, in other words, if reflected-light intensity is sufficiently small, an output of the comparator 154-2 becomes logical value 1. Output signals of those two comparators 154-1 and 154-2 are input to AND circuit 156. Only when its logical multiplication is logical value 1, a pump wave-source current source 157 becomes ON and thereby an pump wave-source driving current 158 is output. More specifically, in the other cases, the excitation current 158 becomes OFF causing an optical amplifier to be interrupted.

In this example, only basic operation is described. In an actual circuit, however, the following functions may be added: giving hysteresis to comparator's operation in order to prevent an effect of noise, and in order to prevent light surge from occurring; producing a given time delay at the time of starting excitation current source; and controlling a plurality of pump wave sources simultaneously or controlling a part of them. In addition, this example is one of embodiments; for example, a combination of A/D converter, D/A converter, and CPU can also realize almost all of the operation by means of a program.

Figure 7:
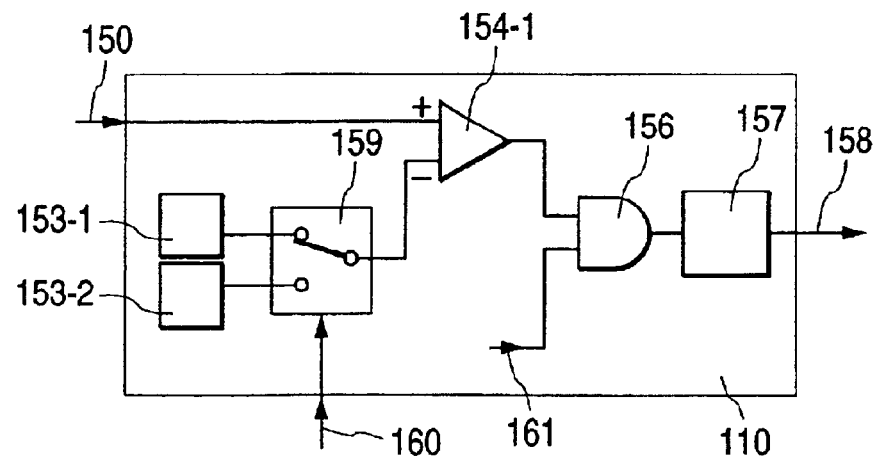
FIG. 7 is a configuration diagram illustrating a fourth embodiment of the present invention.

A forth embodiment is an example that changes detecting threshold values of input and output detection circuits in response to a condition of pump wave, which is the second technical concept of the present invention described above. FIG. 7 is a diagram illustrating the fourth embodiment of the present invention. This example describes that a pump wave-source current 158 from a pump wave-source current source 157 is controlled by a control circuit 110 in response to a condition of Raman pump wave.

In this example, in the control circuit 110, a switch 159 switches between reference voltage sources 153-1 and 153-2 to produce a different reference voltage in response to ON/OFF signal 160 of the Raman pump wave. As a result, a judgment threshold value is changed. An Input-light intensity signal 150 and a signal of said reference voltage value are input to a comparator 154-1. For example, it is assumed that the reference voltage source 153-1 has a high voltage value, and that the reference voltage source 153-2 has a small voltage value. After that, an output signal from this comparator 154-1 and another signal for the control circuit 110 are input to AND circuit 156. As a result, an output of the AND circuit 156 controls the pump wave-source current source 157. By the way, various kinds of optical amplifiers can be used as an optical amplifier itself. For example, the basic configuration as shown in FIG. 1 can be used. In addition, the control circuit can also be applied to optical amplifiers exemplified in the specification of this application. As a matter of course, in those configurations, it is possible to achieve the objectives of the present invention, for example in FIG. 1, by using the control circuit of this example instead of the filters 141 and 142. A similar result can also be obtained from the other examples.

As regard Raman amplification that uses an optical fiber transmission line as a gain medium, ON/OFF of Raman pump wave changes a signal-wavelength gain in the optical fiber, which causes reflected light with the signal wavelength, intensity of input light, and intensity of noise light to be changed. For example, when performing backward-pumping from a downstream side of the optical fiber transmission line, a Raman gain given to the signal wavelength reaches 10 to 20 dB, causing intensity of input-light intensity signal 150 and intensity of noise light to be changed by such degree.

Therefore, when Raman pump wave is ON, increasing an input-light detection level enables proper interruption of the optical amplifier and suppression of light surge. To be more specific, when the ON/OFF signal 160 of Raman pump wave is ON, the reference voltage source 153-1 having a high voltage value is connected. On the other hand, when the ON/OFF signal 160 of Raman pump wave is OFF, the reference voltage source 153-2 having a low voltage value is connected. When pump wave is reduced due to a failure of Raman pump wave source, or the like, lowering an input detection level of an optical amplifier on a downstream side can suppress the function of interrupting the optical amplifier on the downstream side. Because of it, it is possible to limit signal degradation only to minimum signal-to-noise ratio degradation equivalent to that of one Raman amplifier, and also to prevent undesired signal interruption.

ON/OFF signal of Raman pump wave can be obtained and transmitted in any method, so long as it is pump wave ON/OFF information involved in signal amplification. For example, the ON/OFF signal may be transmitted as an electrical signal on a board or through a cable between devices; or the signal may be transmitted as logical information using a monitoring signal and the like between devices and across optical fiber transmission lines. Moreover, as described below, the following method may also be used: separately providing a light detector for a wavelength of Raman pump wave; detecting reflection intensity and input intensity of Raman pump wave; and generating ON/OFF signal by a result of the detection. The threshold value is not necessarily required to be changed between two values (ON/OFF). The threshold value may be changed consecutively or among three values or more. Furthermore, in the embodiment described above, although the example that applies a variable threshold value to only an input detection portion is shown, such variable value can also be applied to a reflected-light detection portion.

Figure 8:
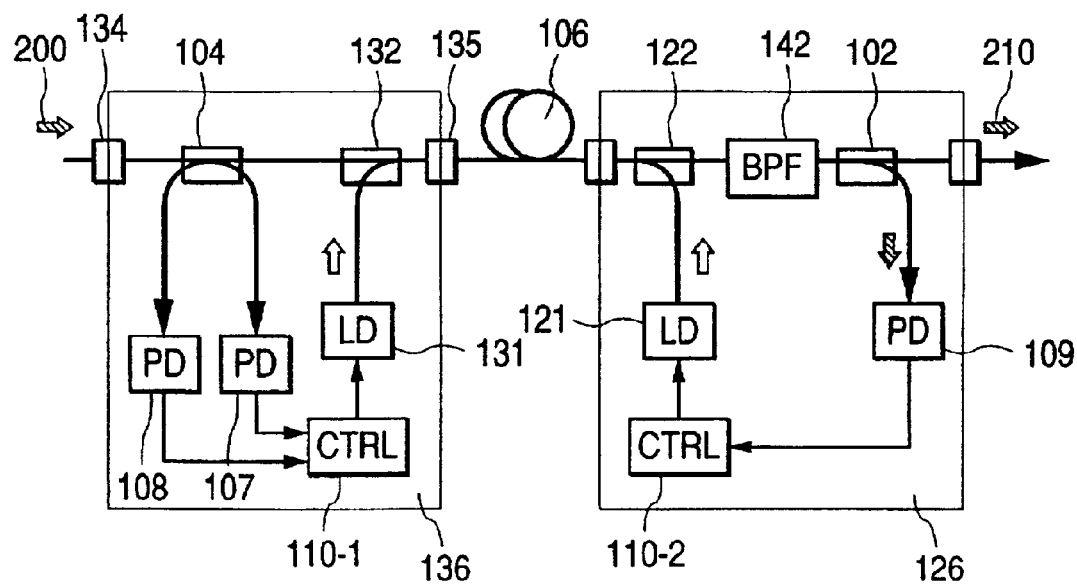
FIG. 8 is a configuration diagram illustrating a fifth embodiment of the present invention.

A fifth embodiment is an example that adjusts intensity of pump wave itself, which is the third technical concept of the present invention described above. FIG. 8 is a diagram illustrating the fifth embodiment of the present invention. This example describes that an optical fiber Raman amplifier has a mechanism for detecting input intensity or output reflection intensity of an input signal for interruption.

In an example shown in FIG. 8, an optical fiber Raman amplifier 136 is connected to one end of an optical fiber transmission line 106, and an optical fiber Raman amplifier 126 is connected to the other end. Signal light 200 is output as output light 210. In FIG. 8, Raman pump wave sources 131 and 121 are provided. They are controlled by control circuits 110-1 and 110-2 respectively. When they are controlled, based on detection light from output-light detectors 107, 109 and reflect-light detector 108, a control signal is input to each of the control circuits. An optical fiber Raman amplifier 136 comprises an optical branch unit 102, and detects input light by the input-light detector 109.

An optical fiber Raman amplifier, which is used in the present invention, utilizes an optical fiber transmission line as a gain medium. Because inside of a portion shown as an optical fiber Raman amplifier does not include a gain medium, input intensity of signal light accords with output intensity of the signal light except a loss of a wavelength multiplexer and the like. Accordingly, the following description does not discriminate between the input intensity and the output intensity; only either of them is measured.

In the optical fiber Raman amplifier 136 on the upstream side of the optical fiber transmission line according to the present invention, the light detectors 107 and 108 detect signal-light intensity, which is input from the input connector 134, and reflected-light intensity to detect open of the output connector 135.

In this example, an optical filter for eliminating pump wave is not required because a wavelength multiplexer 132 for mixing Raman pump wave is located between the reflected-light detector 108 for detecting reflected light from an optical-signal output end and the output connector 135. In the case of optical fiber Raman amplifier, such configuration is allowed because the optical fiber Raman amplifier always comprises a wavelength multiplexer of pump wave. If a wavelength separation degree of the wavelength multiplexer 132 is low, or if pump wave with a different wavelength may leak into, or if locations of the wavelength multiplexer 132 and an optical branch unit 104 are reversed, or in other cases, it is required to insert a Raman pump wave elimination filter into a position just before the light detectors 108 and 107 and the like.

Thus, if signal light is used for detecting output-connector open, it is possible to judge the connector's open to determine whether or not a pump wave source 131 should be lit, before lighting Raman pump wave source of which output is extremely high as compared with the signal light. Therefore, this brings us advantages in operator's safety and protection of connectors and optical parts. In addition, even when input light is turned off during operation, interrupting the pump wave source 131 provides higher safety, and prevents devices located in further downstream portions from malfunctioning.

On the other hand, as regards the optical fiber Raman amplifier 126 on the downstream side of the optical fiber transmission line 106 according to the present invention, input-light intensity is detected using a signal-light wavelength. In this example, a wavelength multiplexer 122 of pump wave and Raman pump wave elimination filter 142 are located between the input-light detector 109 and an input end. Because in particular a threshold value for judging whether or not an input signal to the input-light detector 109 exists is low, the configuration described above relaxes requirements of a wavelength separation degree for the Raman pump wave elimination filter 142 and the wavelength multiplexer 122. A location of the pump wave elimination filter 142 may be between the branch 102 and the input-light detector 109.

Thus, if a light signal is used for judging presence or absence of input, it is possible to check that no connector-open portion exists up to the upstream side without fail, before lighting an pump wave source 121 of which output is high. This enables us to ensure higher safety especially for outside.

In addition, because the input-light detector 109 can measure a signal gain before and after the Raman pump wave source 121 is lit, the measured values can also be used for detecting abnormal operation of amplification. Moreover, particularly in this configuration, when abnormal operation causes a signal light to be interrupted, the Raman amplifier amplifies noise light such as ASE of the optical amplifier on the upstream side, which is judged by mistake that an input signal exists. In such a case, as described in the immediately preceding embodiment, making an input detection level variable can prevent the problem.

Furthermore, contrary to the case described above, when intensity of input-signal light is greater than or equal to a certain level, its cause may include: an abnormal condition such as a misconnection; Raman amplification is not required because a transmission line is short; and the like. In this case, an action such as not lighting pump wave is effective for protecting other devices and optical elements. Additionally, a feedback control of pump wave intensity for keeping signal-light power constant supplies signal light within a normal input range to an optical receiver and an optical amplifier that follow, which enables us to protect parts and to suppress occurrence of a wavelength gain difference.

Figure 9:
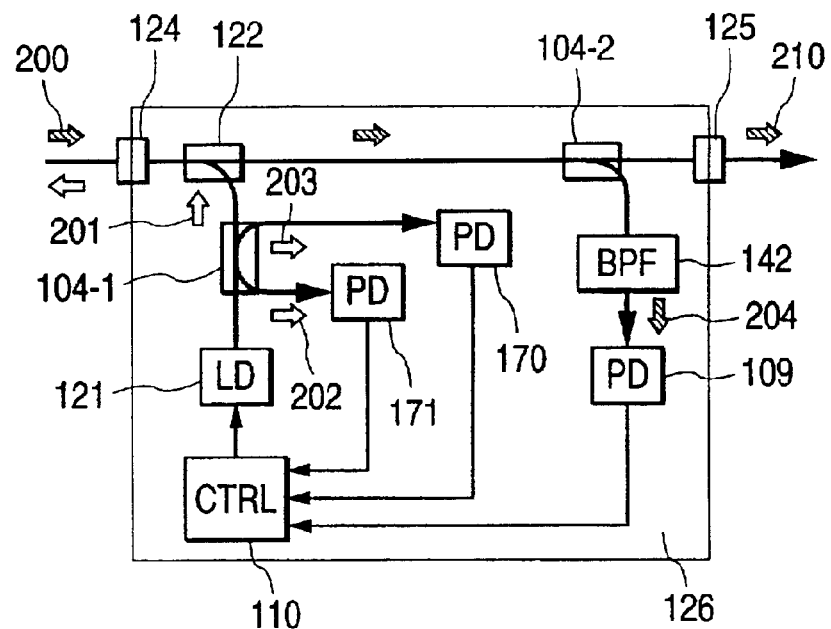
FIG. 9 is a configuration diagram illustrating a sixth embodiment of the present invention.

FIG. 9 shows a sixth embodiment of the present invention. This example shows a configuration of a backward-pump type optical-fiber Raman amplifier 126 that uses Raman pump wave itself for detecting connector's open. The backward-pump type optical-fiber Raman amplifier is a type of Raman amplifier that transmits Raman pump wave in a direction opposite to a traveling direction of signal light. By the way, FIG. 9 shows only a circuit portion of the optical fiber Raman amplifier. Optical fiber transmission line is connected to an input light connector 124. However, the optical fiber transmission line is not illustrated in FIG. 9. In the backward-pump type optical-fiber Raman amplifier, therefore, it is required to detect reflected light from signal input side because intense Raman pump wave is output to the light-signal input connector 124.

In this example, an optical branch unit 104-1 is provided between wavelength multiplexer 122, which mixes pump wave and signal light to be amplified, and Raman pump wave source 121 to obtain output light of pump wave and a part of reflected light, which are detected by an pump wave reflected-light detector 171 and an pump wave output-light detector 170. In this manner, a portion of Raman pump wave and pump wave reflected light are detected. In addition, an input-light detector 109 detects a portion of signal light. A control circuit 110 is controlled according to those signals.

In such configuration, for example, when reflected light 202 of Raman pump wave is detected and indicates that a value of the Raman pump wave at an output end 124 becomes greater than or equal to a given value, the Raman pump wave is reduced or interrupted. In the case of signal light, the input-light detector 109 can detect a portion of the signal light, which permits pump wave to be maintained, reduced, interrupted, or the like in a similar manner. However, in this example, using Raman pump wave for detecting connector's open enables more accurate detection and control.

To be more specific, in this example, signal light 200, which is incident light from the input light connector 124, is sufficiently reduced in the wavelength multiplexer 122 before arriving at the pump wave reflected-light detector 171. As a result, an effect of the signal light is minimized. Therefore, only the reflected light 202 enables open detection.

In addition, as described below, if Raman pump wave is lit while it is increased gradually, or in other similar cases where intensity of pump wave is low, use of a signal-light elimination filter is particularly effective.

Regarding a backward-pump type optical-fiber Raman amplifier, if Raman pump wave is used for detecting input open, a reflection loss can be measured with accuracy using an pump wave wavelength as compared with a case where said incident signal light is used. Because of it, in the case of improper connection of a connector, or the like, open can be detected with reliability. In addition, because intensity of pump wave is greater than that of signal light (100 to 10000 times or more), pump wave has an advantage that it is hardly subject to noise light and disturbance light. Moreover, if a signal is not amplified while pump wave is lit, an input signal sufficient enough to perform input detection may not be obtained. Furthermore, if signal light is use, there are the following problems: signal interruption due to a failure can not be differentiated from input-open detection; and the like.

Normally, intensity of pump wave used for Raman amplification is extremely high (a few 100 mW). Because of it, even when pump wave is used for detecting reflected light, it may cause the following problems at the time of lighting pump wave: breakage of a device that is connected by mistake; and operator's problems. In this example, furthermore, problems including misconnection of input connector, and emission of intense pump wave to outside are prevented by: additionally providing Raman pump wave elimination filter 142 for measuring intensity of a light signal and the input-light detector 109; checking a range of an input signal; and after that lighting pump wave. In this manner, a double detection, that is to say, detecting both an incident signal and reflection of Raman pump wave enables input-open detection with extremely high reliability.

In this connection, if intensity of output light from an output connector 125 becomes dangerously a high level, a reflected-light detector may be provided on this portion. Moreover, in this embodiment, the pump wave output-light detector 170 is additionally provided. This detector may be replaced with a monitor photodiode built into the pump wave source 121, a relation curve between driving current and an pump wave output, or the like.

Figure 10:
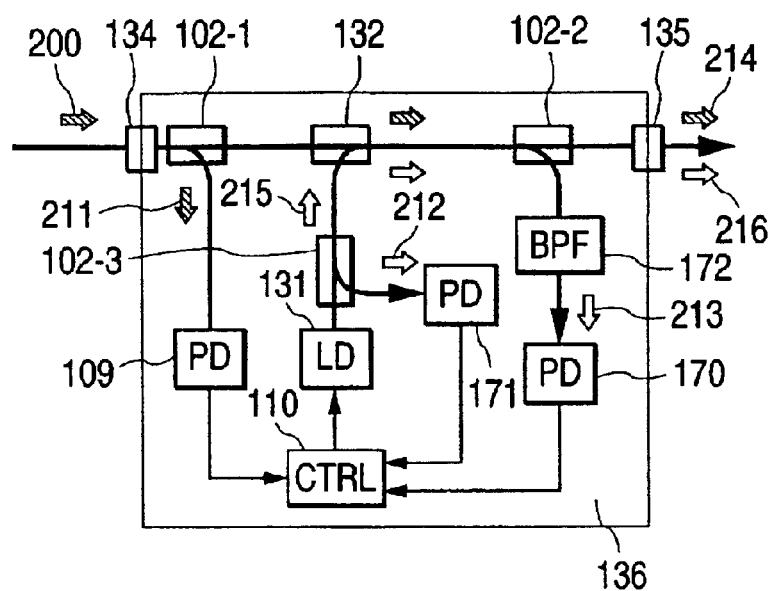
FIG. 10 is a configuration diagram illustrating a seventh embodiment of the present invention.

FIG. 10 is a configuration diagram illustrating a seventh embodiment of the present invention. This example shows a configuration of a forward-pump type optical-fiber Raman amplifier 136 that uses Raman pump wave itself for detecting output's open. By the way, FIG. 10 shows only a circuit portion of the optical fiber Raman amplifier. Optical fiber transmission line is connected to an output light connector 135. However, the optical fiber transmission line is not illustrated in FIG. 10.

The forward-pump type optical-fiber Raman amplifier is a type of Raman amplifier that transmits Raman pump wave in the same direction as a traveling direction of signal light. The forward-pump type optical-fiber Raman amplifier, therefore, is required to detect reflected light from the output connector 135.

In this example, an optical branch unit 102-3 is provided between a wavelength multiplexer 132, which mixes pump wave and signal light to be amplified, and Raman pump wave source 131 to extract a portion of a reflected component of pump wave. Intensity of the reflected light is measured by an pump wave reflected-light detector 171. Thus, in this example, a portion of signal light 211, a portion of reflected light of pump wave 212, and a portion of pump wave are detected. A control circuit 110 is controlled according to those signals. Reference number 109 is an input-light detector, 171 is an pump wave reflected-light detector, and 170 is an pump wave output detector. Signal light 200 is output as output light 214 of the forward-pump type-optical-fiber Raman amplifier 136, and then is transmitted to an optical waveguide. On the other hand, Raman pump wave 215 is output as output light 216 from an output end 135 of the forward-pump type optical-fiber Raman amplifier 136, and then is transmitted to an optical waveguide. The signal light 214 is amplified by stimulated Raman effect using the Raman light 216 in the optical waveguide.

By the way, in this example, there are optical branch units, a wavelength multiplexer, and a signal-light elimination filter. To be more specific, reflected light of pump wave from the output connector 135 passes through an optical branch unit 102-2, the wavelength multiplexer 132, and an optical branch unit 102-3, and reaches the pump wave reflected-light detector 171 as a portion of reflected light of pump wave. A wavelength component of the signal light 200 is set so that it is sufficiently reduced in the wavelength multiplexer 132. As a result, it is possible to prevent a signal-light component from having an effect on open detection that uses an pump wave component.

Thus, using an pump wave component itself has the following advantages: more reliable detection of open can be performed as compared with a case where different signal-light wavelengths are used; using pump wave, of which intensity is from a few times to a few ten times higher than that of signal light, is hardly subject to mixing of noise light and disturbance light; and the like.

Moreover, as exemplified in this embodiment, the pump wave output-light detector 170 measures intensity of an pump wave component 213 that is extracted by a signal-light elimination filter 172 after separately obtaining from the optical branch unit 102-2.

The output-light detector 170 is also not necessarily required to be located at this position. For example, as is the case with the preceding embodiment, this detector may be located at an empty port of the optical branch unit 102-3.

In contrast to the case of said backward-pumping, in this embodiment, detecting presence or absence of input-signal light cannot judge open of the output connector 135 that outputs pump wave.

For this reason, in the present invention, the following means is employed: while monitoring a ratio of a value from reflected-light detector to a value from output detector regarding pump wave, gradually increasing pump light starting from low intensity. More specifically, as shown in FIG. 6, a ratio of reflected-light intensity 151 to output light 152 is calculated by a divider, which is an example of monitoring a ratio of a value from the reflected-light detector to a value of the output detector.

This enables us to detect open of an output connector without endangering the output connector and operators. In this connection, this means can be applied to backward-pump, which presents no problem. If connector's open is detected while lighting of pump wave is started or during operation, the following actions are effective: interrupting pump wave; while lighting with low intensity is kept in preparation for reconnection of the connector, continuously monitoring reflected-light intensity; and the like.

In this embodiment, signal-light intensity is similarly measured by the input-light detector 109. If a level of signal light is smaller than a given level, its cause is considered to be an abnormal condition such as input-signal interruption. If the level exceeds the given level, its cause is considered to be a misconnection; therefore, interrupting pump wave, and raising an alarm to notify the abnormal condition to other devices and the like are effective.

Figure 11:
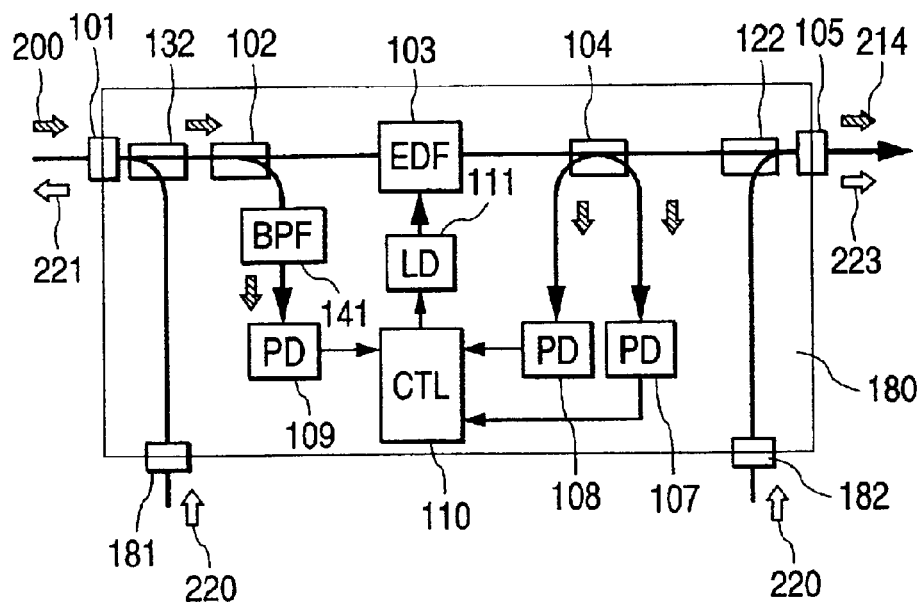
FIG. 11 is a configuration diagram illustrating an eighth embodiment of the present invention.

Next example uses a wavelength multiplexer, of which characteristics serves as an pump wave elimination filter. FIG. 11 shows an eighth embodiment of the present invention. This is a configuration example of an optical amplifier 180 in which wavelength multiplexers for mixing Raman pump wave are contained in advance before input and output ends of the optical amplifier. This is an example showing that a backward-pump type optical-fiber Raman amplifier is provided. The backward-pump type optical-fiber Raman amplifier introduces Raman light into an optical transmission line in a direction opposite to a traveling direction of signal light, and then amplifies light by stimulated Raman effect in this area.

In the example shown in FIG. 11, input light 200 is amplified by an optical amplification medium 103. The pump wave source 111 is located for the optical amplification medium 103. This light source 111 is controlled by a control circuit 110. Moreover, in this example, Raman pump wave 221 and 223 are introduced from input/output ends 101 and 105 into each of optical transmission lines, such as optical fibers, which are connected to the input/output ends. Thus, in an optical system of this example, light is also amplified by stimulated Raman effect furthermore in the optical transmission lines.

Raman pump wave for backward-pumping 220 is input (220) from Raman pump wave input 181, mixed with signal light by a wavelength multiplexer 132, and then output (221) to an optical fiber transmission line connected to an input connector 101. Raman pump wave for forward-pumping is input (222) from Raman pump wave input 182, mixed with signal light by wavelength multiplexer 122, and then output (223) to an optical fiber transmission lire connected to an output connector 105. In this manner, containing wavelength multiplexers for Raman pumping in advance at input and output ends permits wavelength multiplexers 132 and 122 to serve as pump wave elimination filters. Accordingly, regardless of performing Raman pumping in this optical repeater, it is always possible to prevent Raman pump wave from leaking into an input-light detector 109, a reflection detector 108, the optical amplification medium 103, and the like. Also in this configuration, an pump wave elimination filter 141 can be provided on a portion where even a slight leakage of Raman pump wave will have an effect on operation, particularly on a portion like the input-light detector 109, as necessary. In this connection, regarding a configuration containing wavelength multiplexers in advance like this, the configuration may be applied to a preamplifier and a post-amplifier. Additionally, the configuration may also contain only either a backward-pump type wavelength multiplexer or a forward-pump type wavelength multiplexer for mixing Raman pump wave.

Figure 12:
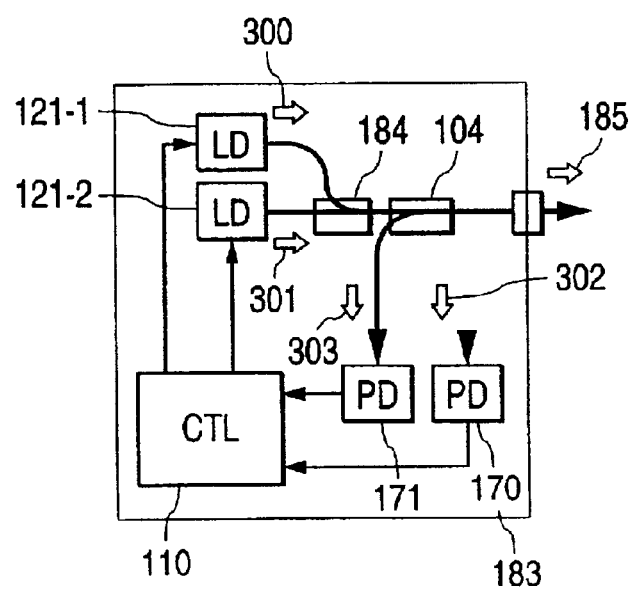
FIG. 12 is a configuration diagram illustrating an ninth embodiment of the present invention.

Next, an example of a light source for wavelength-division-multiplexed excitation is described. Such light source can be configured separately from an optical amplifier to use it as a light source for exciting optical amplifiers that have been described above. FIG. 12 shows a configuration example of pump wave source device 183, which is a ninth embodiment of the present invention. As shown in FIG. 11, this light source is for example connected to pump wave-source inputs 181 and 182 for use.

This example shows a configuration of wavelength-division-multiplexed excitation. There are Raman pump wave sources 121-1 and 121-2 having a different wavelength each other, of which output light 300 and 301 are mixed by Raman pump wave wavelength multiplexer 184 and then connected to Raman pump wave output 185 via an optical branch unit 104. A portion 302 of the Raman pump wave is introduced into an pump wave output-light detector 170. A portion 303 of reflected light returned from the Raman pump wave output 185 is introduced into an pump wave reflected-light detector 171. In this connection, those light 302 and 303 are wavelength-division-multiplexed light. A control circuit 110 monitors a ratio between output signals from both light detectors, and has a function of interrupting pump wave when reflected-light intensity exceeds a given value. In addition, at the time of starting pump wave, the control circuit 110 starts lighting pump wave gradually while monitoring the reflected light intensity.

If this control circuit is connected to the pump wave input 181 of the optical amplifier shown in FIG. 11, not only the pump wave output 185 but also reflected light of pump wave generated at points including the pump wave input 181 and an input connector 101 can be detected without problems. Moreover, if it is desired that signals using other wavelength bands do not leak into, or in other cases, providing an optical filter for eliminating light having those wavelengths can prevent such signals.

In this manner, preparing an pump wave source as a separate device that contains a reflected-light detector has the following advantages: allowing us to add a Raman pump wave source, which is expensive, only when it is necessary; and allowing us to replace a device during operation. Regarding multiple-repeat transmission using a plurality of optical repeaters, a configuration that allows us to replace a device during operation has a great advantage because a failure of one Raman amplifier does not always cause critical degradation of signal-to-noise ratios of all light signals. Additionally, reflection detection between a portion, which mixes pump wave with signal light, and pump wave source always becomes possible. Because of it, such configuration has also an advantages that unnecessary optical filters can be removed for a simpler configuration. Moreover, because a control portion of pump wave source can be completely separated from a control portion of signal light, transmission of signals between devices and control algorithm can be simplified.

By the way, although the following is not limited to this embodiment, if input/output portions and connector portions for a light signal and pump wave are optical-fiber connectors, they may include a means such as a configuration for splicing fiber wires or a portion that connects an optical signals collimated in a space by a lens system. In either case, when an abnormal reflection or loss occurs at those portions, the means for detecting reflection according to the present invention works without problems.

In addition, a number of Raman pump wave sources and a intensity ratio may be set arbitrarily as necessary, which is also not limited to this embodiment. Generally, the number of Raman pump wave sources and the intensity ratio have an effect on a Raman gain and wavelength dependence of a gain. Setting them properly provides flattening of the gain, and automatic gain equalization. As regards detection of reflection and output intensities of pump wave, the detection may be performed by measuring a sum of a plurality of pump wave as shown in this example, or the detection may be performed for a specific pump wave source. The latter can be easily realized by changing a location of an optical branch unit 104 to between a specific light source and a wavelength multiplexer 184.

Figure 13:
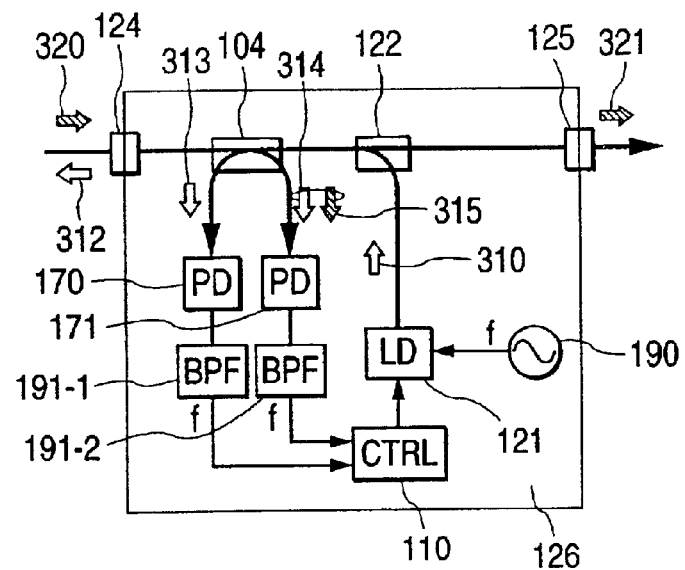
FIG. 13 is a configuration diagram illustrating a tenth embodiment of the present invention.

FIG. 13 shows a tenth embodiment of the present invention. This is an example showing that Raman pump wave of a backward-pump type optical-fiber Raman amplifier 126 is sine-wave intensity-modulated at frequency f.

This optical-fiber Raman amplifier 126 comprises an pump wave source 121. Pump wave 310 is emitted from an input connector 124. A portion 313 of this pump wave 310 is detected by an pump wave output detector 170. A portion 314 of reflected light from an pump wave input connector 124 is detected by an pump wave reflected-light detector 171. Each of signals from the detectors controls a control circuit 110 as desired. In the FIG. 13, reference number 104 is an optical branch unit, and 122 is a wavelength multiplexer.

In this example, a signal from sine-wave generator 190 is applied to driving current of the pump wave source 121. Pump wave that is output is superposed by sine-wave amplitude modulation. Sine-wave frequency f is set to for example a few MHz so that a wavelength of the sine wave becomes shorter than an effective length of nonlinear effect of an optical fiber transmission line (Leff=1/a, where a is a loss coefficient of an optical fiber transmission line at an pump wave source). That is to say, a relation of f>ac holds (where c is velocity of light). Signal light travels in a direction opposite to that of pump wave. Because of it, even if pump wave is modulated, when frequency is sufficiently greater than the value described above, a Raman gain given to signal light is spatially averaged, which does not cause the signal light to be degraded. In the case of pump wave that travels in the same direction as that of signal light, performing such modulation causes signal light to be intensity-modulated, resulting in degradation of transmission characteristics. A modulated component, therefore, is required to be extremely small (for example, 10% or less).

In this manner, if Raman pump wave is modulated, extracting a modulated component from a light detector's output signal enables us to know intensity and a reflection ratio of pump wave with accuracy even when there is disturbance light.

In this example, signal light and pump wave are received by an pump wave output-light detector 170 and an pump wave reflected-light detector 171 respectively. At this time, the detected signals are converted to electrical signals. In this electrical-signal area, only a modulated component with a frequency f is extracted using band-pass filters 191-1 and 191-2 having a center frequency f. Because of it, even if signal light and an pump wave component from an upstream are mixed into, only a backward-pump wave component can be extracted without providing an optical filter. In addition, a Fresnel-reflected component at an open end in some midpoint of a fiber keeps a modulated component. However, in the case of a component that is reflected in a distributed manner like Rayleigh scattering, a modulated component is spatially averaged and becomes extremely small. Accordingly, this allows us to lower a detection threshold value and enables us to detect an opened end with accuracy by means of Fresnel reflection.

In this connection, a modulated signal is not necessarily required to be a sine wave so long as the lowest frequency component meets the conditions described above. The modulated signal may be generated by modulating with information signal for example. Such modulated signal can be used for transmitting monitoring information and an alarm from an optical fiber Raman amplifier on a downstream side to an optical fiber Raman amplifier or an optical transmitter on an upstream side. This case eliminates the need for providing a dedicated transmitter-receiver for monitoring information, which enables us to simplify a device configuration.

Figure 14:
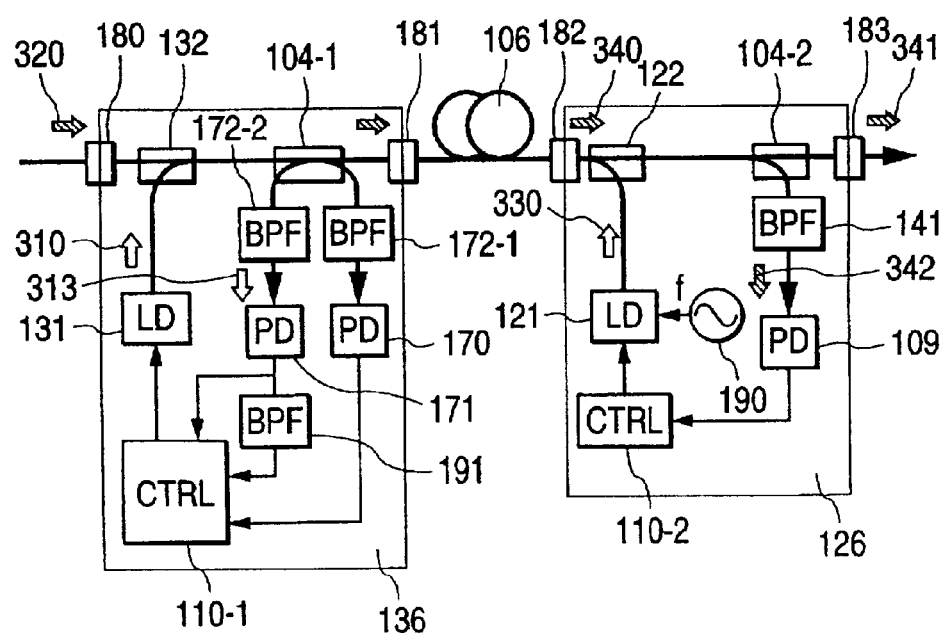
FIG. 14 is a configuration diagram illustrating an eleventh embodiment of the present invention.

FIG. 14 shows an eleventh embodiment of the present invention. This is an example showing that an optical amplifier on an upstream side of an optical fiber transmission line receives a modulated component of pump wave from a downstream side to detect an pump wave lighting condition of a Raman amplifier on the downstream side.

As regards output-open detection using reflected intensity of signal light, when a distance from an output end to an opened point is over a few km causing a few dB loss between both of the points, there was the following problem: a level of reflected-light becomes too small to detect an output's open. However, regarding wavelength-division-multiplexing transmission and high-power transmission, intensities of signal light and pump wave are kept high even at a position a few km away, and may become a level requiring open detection. In this embodiment, in order to detect output's open with higher reliability, an optical amplifier located on the downstream side of an optical fiber transmission line detects presence or absence of signal light from the upstream side, and an optical amplifier located on the upstream side detects Raman pump wave from the downstream side.

In this example, an optical fiber Raman amplifier 136 on the upstream side, an optical fiber transmission line 106, and optical fiber Raman amplifier 126 are connected in a cascade form. This optical fiber Raman amplifier 136 on the upstream side comprises an pump wave source 131. Pump wave 310 is emitted from an output connector 181. A portion of this pump wave 310 is detected by an pump wave output detector 170. A portion 313 of reflected light from the pump wave output connector 181 is detected by pump wave reflected-light detector 171. Each of signals from the detectors controls a control circuit 110-1 as desired. In this example, there are signal-light elimination filter 172-1, 172-2, and a band-pass filter 191. This optical fiber Raman amplifier 126 on the downstream side comprises an pump wave source 121. Pump wave 330 is emitted from an input connector 182. Signal light 340 is output (341) from an output end 183. In addition, a portion (342) of the signal light is detected by an input-light detector 109. The signal from this detector controls a control circuit 110-2. In this example, light from said pump wave source 121 is modulated by sine-wave generator 190 at a frequency f. Moreover, there is Raman light elimination filter 141 before input-light detector 109.

In this example, taking characteristics of a Raman amplifier into consideration, for example, starting steps as shown below are taken. First, Raman pump wave on both upstream and downstream sides is interrupted; on the side of downstream the optical fiber Raman amplifier 126, input signal light that has passed through the pump wave elimination filter 141 is detected by the input-light detector 109; and if an optical-signal level is greater than or equal to a given level, it is shown that there is no opened connector on the upstream side. The control circuit 110-2 lights pump wave 121 to transmit the modulated pump wave to the upstream side. On the other hand, if a level of the input signal light becomes lower than or equal to the given level during operation, Raman pump wave is interrupted.

Figure 16:
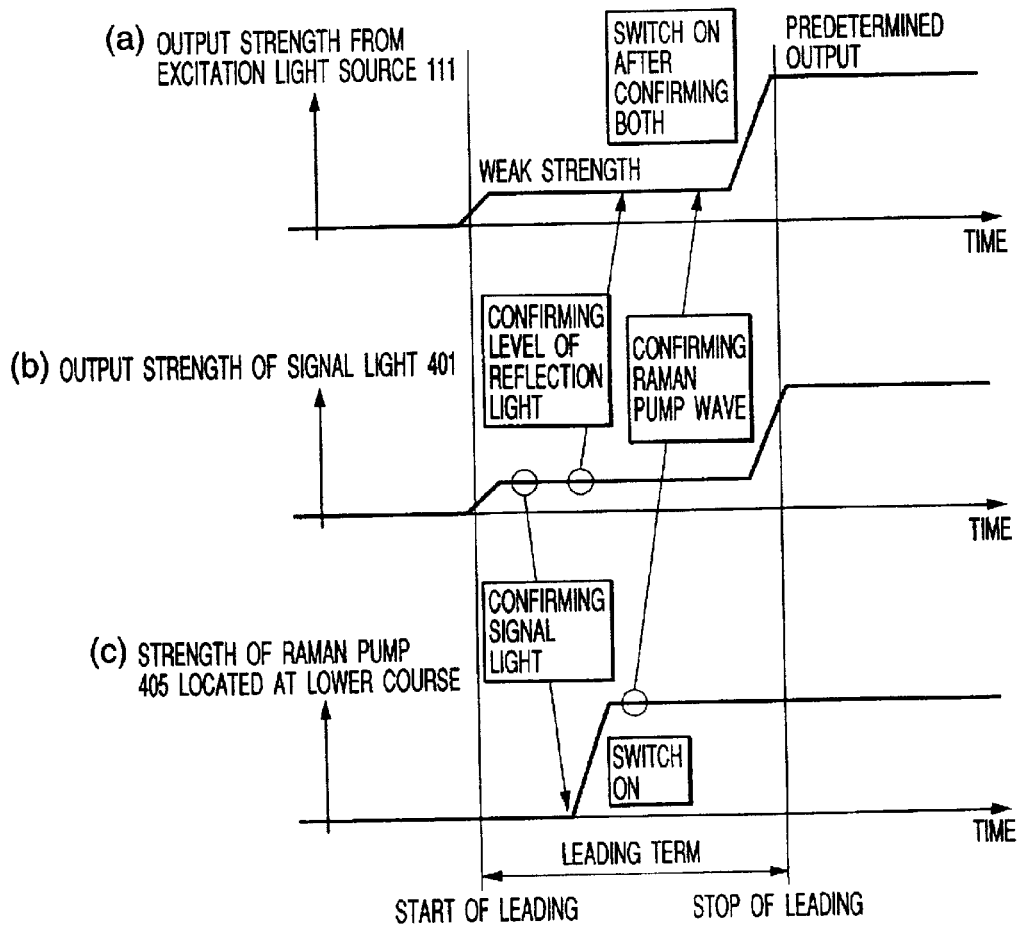
FIG. 16 is a time chart illustrating an example of starting pump wave.

Next, in the optical fiber Raman amplifier 136 on the upstream side, intensity of pump wave, which is input from the optical fiber transmission line 106 side and passes through a branch unit 104-1 and a signal-light elimination filter 172-2, is detected by the pump wave reflected-light detector 171. In particular, band-pass filter 191 extracts a component, which has been modulated at a frequency f, from an output of the pump wave reflected-light detector 171. Intensity of pump wave from the downstream side, therefore, can be judged from intensity of this modulated component. If this level is greater than or equal to a given level, it is shown that there is no opened connector on the downstream side. In response to this, control circuit 110-1 lights pump wave 131. On the other hand, if the level of said modulated component becomes lower than or equal to the given level during operation, Raman pump wave is interrupted. The starting steps described above permits pump wave to be started with extremely high reliability. FIG. 16 exemplifies a condition of starting pump wave.

By the way, depending on a loss of an optical fiber transmission line or a transmission-signal level, there is also a case where a signal level for the input-light detector 109 on the downstream side is too low to detect the signal without starting either the upstream or the downstream optical fiber Raman amplifier, or both of them. In this case, the following means or the like is effective: firstly, either or both of Raman pump wave is started with safe low intensity, and then reflection is detected.

This example shows that only Raman pump wave on the downstream is modulated to avoid degradation of signal light due to Raman pump wave modulation. If degradation of signal light to some extent is allowed, Raman pump wave on the upstream side can also be modulated. In this case, encoding with a different modulation frequency and different codes from those of the downstream side permits pump wave on the upstream side and on the downstream side to be differentiated. This upstream-side modulated component can be applied to detection of connector's open in a similar manner to the downstream-side modulation.

Figure 15:
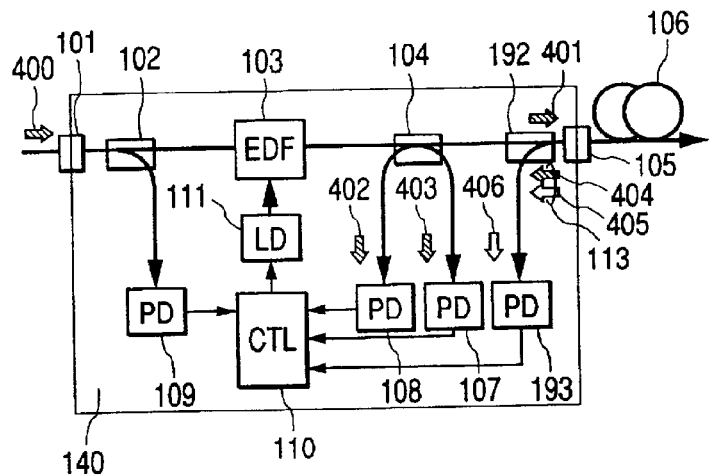
FIG. 15 is a configuration diagram illustrating a twelfth embodiment of the present invention.

FIG. 15 shows a twelfth embodiment of the present invention. As compared with the preceding embodiment, this example shows a configuration in which an optical amplifier 140 other than Raman amplifiers is located on an upstream side of an optical transmission line. The optical amplifier 140 comprises an optical amplification medium (for example, EDF) 103. This EDF 103 is excited by an pump wave source 111. Signal light 400 is amplified by optical amplifier 103, and emitted (401) from an output light connector 105 to an optical transmission line 106. In this example, the input signal 400 is branched by an optical branch unit 102, and a portion of the branched light is detected by an input-light detector 109. In addition, a portion (403) of the amplified signal light is detected by an output-light detector 107. A portion (402) of light, which is branched by an optical branch unit 104 from reflected light 404 of the amplified signal, is detected by a reflected-light detector 108. On the other hand, regarding Raman pump wave from a Raman pump wave source on the downstream side, a portion (405) is introduced into the optical amplifier 140 as incident light. After that, the portion 405 passes through a wavelength multiplexer 192, and detected by an pump wave input-light detector 193. As a result, a control circuit 110 controls pump wave according to a result of each detector 109, 108, 107, and 193.

In this example, a wavelength multiplexer 192 for wavelength-mixing a Raman pump wave wavelength and a signal-light wavelength is located on an output portion of the optical amplifier 140 that uses EDF. And immediately after the wavelength multiplexer 192, the pump wave input-light detector 193 is located to detect intensity of pump wave transmitted from the downstream side. By the way, in this example, on the assumption that characteristics of the wavelength multiplexer 192 serve as an pump wave elimination filter, an pump wave elimination filter is not located before each of the output-light detector 107 and the reflected-light detector 108 that detect signal light.

If a signal level that is output from the optical amplifier 140 is dangerously high, the pump wave source 111 is initially started at a low level when it is started, and low-power signal light is transmitted. When an optical fiber Raman amplifier (this amplifier is not shown in FIG. 15) on a downstream side of the optical fiber transmission line 106 detects this signal, this amplifier transmits Raman pump wave from the downstream side. When the pump wave input detector 193 detects the Raman pump wave from the downstream side, and if its level is higher than or equal to a prescribed level, and at the same time if an light-intensity ratio between the reflected-light detector 108 and the output-light detector 107 is lower than or equal to a given level, the control circuit 110 increases the pump wave source 111 to an normal prescribed output level. In this manner, regarding both reflection from the upstream side and pump wave from the downstream side, checking presence or absence enables open detection with higher reliability.

By means of the present invention, even if an optical amplifier is used in combination with an optical fiber Raman amplifier, mechanism of input-signal detection and output-open detection permits those amplifiers to work normally. In addition, the functions described above can also be added to the optical fiber Raman amplifier. Moreover, a method for starting and interrupting an optical amplifier, in which specificity of the Raman amplifier is taken into consideration, enables us to ensure higher safety.

The present invention can provide an optical amplifier that does not malfunction even when intense pump wave is used. Moreover, the present invention can provides a Raman amplifier that does not malfunction even when intense pump wave is used.

Furthermore, the present invention can provides an optical transmission device or an optical transmission system, which does not malfunction even when intense pump wave is used.

DESCRIPTION OF REFERENCE NUMBERS

100 Conventional optical amplifier
101 Input light connector
102 Optical branch unit
103 Optical amplification medium
104 Optical branch unit
105 Output light connector
106 Optical fiber transmission line
107 Output-light detector
108 Reflected-light detector
109 Input-light detector
110 Control circuit
111 Pump wave source
112 Output light
113 Reflected light
120 Optical fiber Raman amplifier (backward-pumping)
121 Raman pump wave source
122 Wavelength multiplexer
123 Raman pump wave
124 Input light connector
125 Output light connector
126 Optical fiber Raman amplifier (backward-pumping) according to the present invention
130 Optical fiber Raman amplifier (forward-pumping)
131 Raman pump wave source
132 Wavelength multiplexer
133 Raman pump wave
134 Input light connector
135 Output light connector
136 Optical fiber Raman amplifier (forward-pumping) according to the present invention
140 Optical amplifier according to the present invention
141 Raman pump wave elimination filter
142 Raman pump wave elimination filter
143 Wavelength multiplexer
150 Input-light intensity signal
151 Reflected-light intensity signal
152 Output-light intensity signal
153 Reference voltage source
154 Comparator
155 Divider
156 AND circuit
157 Pump wave-source current source
158 Pump wave-source driving current
159 Switch
160 Raman pump wave on/off signal
161 Other control signals
170 Pump wave output-light detector
171 Pump wave reflected-light detector
172 Signal-light elimination filter
180 Optical repeater according to the present invention
181 Raman pump wave input
182 Raman pump wave input
183 Pump wave source device according to the present invention
184 Raman pump wave wavelength multiplexer
185 Raman pump wave output
190 sine-wave generator (frequency f)
191 Band-pass filter (center frequency f)
192 Wavelength multiplexer
193 Pump wave input-light detector

What is claimed is:

1. An optical amplifier coupled to a source of Raman pump waves, comprising;

an input end of an optical signal;

an output end of the optical signal;

optical gain mediums placed between the input end and the output end;

at least one member selected from a group consisting of
a first light detector for detecting intensity of reflected
light from the output end of the optical signal that is
input from said input end and a second light detector for
detecting light intensity of the optical signal that is
input from said input end;

means for preventing reflections of said Raman pump
waves from preventing proper operation of said first
and second light detectors, said means including a
band-pass filter that blocks substantially all of the
Raman pump waves from passing through the band-
pass filter, and that allows substantially all of the optical
signals, which are input from the input end and ampli-
fied by one of the optical gain mediums, to pass through
the band-pass filter, said band-pass filter being located
at least either between said light output end and the first
light detector for detecting intensity of reflected light
from the output end of the optical signal, or between
said light input end and the second light detector for
detecting light intensity of the optical signal that is
input from the input end; and at least one gain control circuit which reduces or turns off
an optical gain of a corresponding optical medium,
either when the reflected light intensity and/or the light
reflection ratio from the output end measured by the
first light detector exceeds a specified threshold value,
or when the input light from the input end intensity
measured by the second light detector become smaller
than a specified threshold value.

2. An optical system comprising an optical amplifier, an
optical fiber connected to the optical amplifier, and a portion
for emitting the Raman pump waves, comprising:

an input end of an optical signal:

an output end of the optical signal;

optical gain mediums placed between the input end and
the output end;

at least one member selected from a group consisting of
a light detector for detecting intensity of reflected light
from the output end of the optical signal that is input
from said input end and a light detector for detecting
light intensity of the optical signal that is input from
said input end;

a band-pass filter that blocks substantially all of the
Raman pump waves from passing through the band-
pass filter, and that allows substantially all of the optical
signals, which are input from the input end and ampli-
fied by one of the optical gain mediums, to pass through
the band-pass filter, said band-pass filter being located
at least either between said light output end and the
light detector for detecting intensity of reflected light
from the output end of the optical signal, or between
said light input end and the light detector for detecting
light intensity of the optical signal that is input from the
input end;

at least one gain control circuit which reduces or turns off
an optical gain of a corresponding optical medium,
either when the reflected light intensity and/or the light
reflection ratio from the output end measured by the
light detector exceeds a specified threshold value, or
when the input light from the input end intensity
measured by the light detector become smaller than a
specified threshold value:

a light detector for detecting intensity of reflected light
from an output end of the Raman pump waves, or a
light detector for detecting output-light intensity at the
output end of the Raman pump waves;

a band-pass filter that allows substantially all of the
wavelengths of the Raman pump waves to pass through
the band-pass filter, and that blocks at least an optical-
signal wavelength in the optical system and wave-
lengths of other pump waves from outside of the optical
system from passing through the band-pass filter, said
band-pass filter being located between said light detec-
tor for detecting intensity of reflected light from said
output end of the Raman pump waves and the output
end, or between said light detector for detecting output-
light intensity at the output end of Raman pump waves
and the output end; and a gain control circuit which reduces or turns off the
Raman pump waves, when the reflected light intensity
and/or the light reflection ratio from the output end
measured by the light detector exceeds a specified
threshold value.

3. An optical system according to claim 2, wherein:

said portion for emitting Raman pump waves is one of the
following:

an optical fiber Raman amplifier that uses an optical fiber
transmission line as a gain medium;

pump wave sources for optical fiber Raman amplification;
and an input portion of the Raman pump waves sources for
optical fiber Raman amplification.

4. An optical system according to claim 3, wherein:

at least either a threshold value for judging a result of light
detection performed in the light detector for detecting
input light of said optical amplifier, or a threshold value
for judging a result of light detection performed in the
light detector for detecting output reflected light of said
optical amplifier, can be changed to a plurality of values
in response to a threshold value that corresponds to
either an output condition of an optical Raman ampli-
fier or an output condition of the Raman pump waves,
determined from means for providing an ON/OFF
signal of the Raman pump waves.

5. An optical system comprising an optical amplifier, an
optical fiber connected to the optical amplifier, and a portion
for emitting the Raman pump waves, comprising:

an input end of an optical signal;

an output end of the optical signal;

optical gain mediums placed between the input end and
the output end;

an wavelength multiplexer, which mixes a pump wave for
optical fiber Raman amplification toward an optical
fiber transmission line connected to said optical
amplifier, on the input end or the output end, or on both
of the input end and the output end;

a light detector for detecting an input light signal from
said input end; and a light detector for detecting intensity of reflected light
from said output end, wherein said wavelength multiplexer is located between
said output end and the light detector for detecting
intensity of reflected light from the output end of the
light signal, or both between said input end and the
light detector for detecting the input light signal from
the input end, and between said output end and the light
detector for detecting intensity of reflected light from
the output end of the light signal;

at least one gain control circuit which reduces or turns off
an optical gain of said optical mediums, either when the
reflected light intensity and/or the light reflection ratio measured by the light detector from the output end exceeds a specified threshold value, or when the input light intensity measured by the light detector from the input end becomes smaller than a specified threshold value;

a light detector for detecting intensity of reflected light from an output end of the Raman pump waves, or a light detector for detecting output-light intensity at the output end of the Raman pump waves;

a band-pass filter that allows substantially all of the wavelengths of the Raman pump waves to pass through the band-pass filter, and that blocks at least an optical-signal wavelength in the optical system and wavelengths of other pump waves from outside of the optical system from passing through the band-pass filter, said band-pass filter being located between said light detector for detecting intensity of reflected light from said output end of the Raman pump waves and the output end, or between said light detector for detecting output-light intensity at the output end of Raman pump waves and the output end; and a gain control circuit which reduces or turns off the Raman pump waves, when the reflected light intensity and/or the light reflection ratio from the output end measured by the light detector exceeds a specified threshold value.

6. An optical system according to claim 5, wherein:

said portion for emitting Raman pump waves is one of the following:

an optical fiber Raman amplifier that uses an optical fiber transmission line as a gain medium;

pump wave sources for optical fiber Raman amplification; and an input portion of the Raman pump waves sources for optical fiber Raman amplification.

7. An optical according to claim 5 wherein:

the threshold value can be changed to a plurality of values in response to an output condition of an optical fiber Raman amplifier or an output condition of the Raman pump waves, determined from means for providing an ON/OFF signal of the Raman pump waves.

8. An optical system according to claim 5 wherein:

the threshold value can be changed to a plurality of values in response to an output condition of an optical fiber Raman amplifier or an output condition of the Raman pump waves.

9. A device for emitting Raman pump waves comprising:

light detectors, which detect either intensity of reflected light from an output end of Raman pump wave, or a ratio of intensity of reflected light from the output end of a Raman pump wave to intensity of an output from the output end of Raman puma waves;

a gain control circuit which reduces or turns off the Raman pump waves, when the reflected light intensity and/or the light reflection ratio from the output end measured by the light detector exceeds a specified threshold value; and a band-pass filter that allows substantially all of the wavelengths of the Raman pump waves to pass through the band-pass filter, and that blocks at least an optical-signal wavelength in an optical system included in the device and wavelengths of other pump waves from outside of the optical system from passing through the band-pass filter, said band-pass filter being located between a light detector for detecting intensity of reflected light from an output end of the Raman pump waves and the output end of the Raman pump waves.

10. A device for emitting Raman pump waves according to claim 9, wherein:

when intensity of reflected light from said output end or a ratio of intensity of reflected light from the output end to intensity of output light exceeds a specified threshold value, said device can perform one of the following:

displaying an alarm; or transferring information, which notifies that intensity of reflected light from said output end or a ratio of intensity of reflected light from the output end to intensity of output light has exceeded the specified value, to other devices.

11. A device for emitting Raman pump waves according to claim 9, wherein:

when starting said Raman pump waves, the pump waves are lit with a first light-intensity while measuring at least either intensity of reflected light from said output end or a ratio of intensity of reflected light from the output end to intensity of output light; and according to detection of the intensity of reflected light from the output end or the ratio of intensity of reflected light from the output end to intensity of output light, when said first light-intensity value is lower than or equal to a given value, intensity of said pump waves can be increased to a predetermined value, and when said first light-intensity value exceeds the given value, operation, which is different from that in the case where said first light-intensity value is lower than or equal to the given value, can be performed.

12. A device for emitting Raman pump waves according to claim 11, wherein:

as said operation, which is different from that in the case where said first light-intensity value is lower than or equal to the given value, said device is capable of; displaying an alarm; or transferring information, which notifies that intensity of reflected light from said output end or a ratio of intensity of reflected light from the output end to intensity of output light has exceeded the specified value, to other devices.

13. A device for emitting Raman pump waves comprising:

emitting sources of Raman pump waves;

an input end of light;

an output end of light;

optical gain mediums placed between the input end and the output end at least one of the following: a light detector for detecting intensity of reflected light from an output end of a light signal that is input from said input end; and a light detector for detecting light intensity of a light signal that is input from said input end;

a wavelength selecting member that blocks Raman pump waves from passing through the member, and that allows substantially all of the optical signals, which are input from the input end and amplified by one of the optical gain mediums, to pass through the wavelength selecting member, said wavelength selecting member being located at least either between said light output end and the light detector for detecting intensity of reflected light from the output end of the optical signal, or between said light input end and the light detector for detecting light intensity of the optical signal that is input from the input end;

at least one gain control circuit which reduces or turns off an optical gain of the optical mediums, either when the reflected light intensity and/or the light reflection ratio measured by the light detector from the output end exceeds a specified threshold value, or when the input light intensity measured by the light detector from the input end becomes smaller than a specified threshold value;

a light detector for detecting Intensity of reflected light from said output end of the Raman pump waves, or a light detector for detecting output-light intensity at said output end of the Raman pump wave; and a band-pass filter that allows a wavelength of the Raman pump wave to pass through the band-pass filter, and that blocks at least an optical-signal wavelength in the optical system and wavelengths of other pump waves from outside of the optical system from passing through the band-pass filter, said band-pass filter being located between said light detector for detecting intensity of reflected light from said output end of the Raman pump waves and the output end, or between said light detector for detecting output-light intensity at the output end of the Raman pump waves and the output end; and a gain control circuit which reduces or turns off the Raman pump waves, when the reflected light intensity and/or the light reflection ratio from the output end measured by the light detector exceeds a specified threshold value.

14. A device for emitting Raman pump waves, comprising:

emitting sources of Raman pump waves;

an input end of a light signal;

an output end of the light signal;

optical gain mediums placed between the input end and the output end;

a wavelength multiplexer, which mixes a pump wave for optical fiber Raman amplification toward an optical fiber transmission line connected to said optical amplifier on the input portion or the output portion, or on both of the input portion and the output portion;

a light detector for detecting an input light signal from said input end; and a light detector for detecting intensity of reflected light from said output end;

wherein said wavelength multiplexer is located between said input portion and the light detector for detecting the input light signal from the input end, or between said output end and the light detector for detecting intensity of reflected light from the output end of the light signal, or on both of the locations;

at least one pain control circuit which reduces or turns off an optical gain of the optical mediums, either when the reflected light intensity and/or the light reflection ratio measured by the light detector from the output end exceeds a specified threshold value, or when the input light intensity measured by the light detector from the input end becomes smaller than a specified threshold value;

a light detector for detecting intensity of reflected light from an output end of said Raman pump wave, or a light detector for detecting output-light intensity at said output end of said Raman pump wave; and a band-pass filter that allows a wavelength of the Raman pump waves to pass through the band-pass filter, and that blocks at least an optical-signal wavelength in the optical system and wavelengths of other pump waves from outside of the optical system from passing through the band-pass filter, said band-pass filter being located between said light detector for detecting intensity of reflected light from said output end of the Raman pump waves and the output end, or between said light detector for detecting output-light intensity at the output end of the Raman pump waves and the output end; and a gain control circuit which reduces or turns off the Raman pump waves, when the reflected light intensity and/or the light reflection ratio from the output end measured by the light detector exceeds a specified threshold value.

15. An optical transmission device comprising an optical fiber Raman amplifier located on a downstream side of an optical fiber transmission line, wherein:

said optical fiber Raman amplifier transmits a pump wave toward an upstream side of the optical fiber transmission line to amplify an optical signal, and intensity-modulates a pump wave source using a frequency ac or more (where a is a loss coefficient of an optical fiber transmission line at a pump wave source, and c is velocity of light); and said modulated component is used for detecting an open input of the optical fiber Raman amplifier, or an open input of the optical transmission device located on the upstream side; or information is transferred to the optical transmission device located on the upstream side.

16. An optical fiber Raman amplifier located on an upstream side of an optical fiber transmission line wherein said optical amplifier transmits a pump wave toward a downstream side of the optical fiber transmission line to amplify an optical signal, wherein:

said optical amplifier is capable of:

small-signal intensity-modulating an pump wave source using a frequency ac or more (where a is a loss coefficient of an optical fiber transmission line at a pump wave source, and c is velocity of light);

detecting said modulated component; and detecting an open output condition of said pump wave according to the detection of the modulated component.

17. An optical fiber Raman amplifier located on an upstream side of an optical fiber transmission line wherein said optical amplifier transmits a pump wave toward a downstream side of the optical fiber transmission line to amplify an optical signal, wherein:

said optical amplifier is capable of:

small-signal intensity-modulating a pump wave source using a frequency ac or more (where a is a loss coefficient of an optical fiber transmission line at an pump wave source, and c is velocity of light);

detecting said modulated component; and detecting an open input by a light detection means located on the downstream side of the optical fiber transmission line according to the detection of the modulated component.

18. An optical amplifier coupled to a source of Raman pump waves, comprising:

an input end of an optical signal;

an output end of the optical signal;

optical gain mediums placed between the input and the output end;

a wavelength multiplexer, which mixes a pump wave for optical fiber Raman amplification toward an optical fiber transmission line connected to said optical amplifier, on the input end or the output end, or on both of the input end and the output end;

at least one member selected from a group consisting of a first light detector for detecting intensity of reflected light from the output end of the optical signal that is input from said input end and a second light detector for detecting light intensity of the optical signal that is input from said input end;

means for preventing reflections of said Raman pump waves from Preventing proper operation of said first and second light detectors, said means including a band-pass filter that blocks substantially all of the Raman pump waves from passing through the band-pass filter, and that allows substantially all of the optical signals, which are input from the input end and amplified by one of the optical gain mediums, to pass through the band-pass filter, said band-pass filter being located at least either between said light output end and the first light detector for detecting intensity of reflected light from the output end of the optical signal, or between said light input end and the second light detector for detecting light intensity of the optical signal that is input from the input end; and at least one gain control circuit which reduces or turns off an optical gain of a corresponding optical medium, either when the reflected light intensity and/or the light reflection ratio from the output end measured by the first light detector exceeds a specified threshold value, or when the input light from the input end intensity measured by the second light detector become smaller than a specified threshold value.

19. An optical amplifier coupled to a source of Raman pump waves, comprising:

an input end of an optical signal;

an output end of the optical signal;

optical gain mediums placed between the input and the output end;

at least one of the following: a first light detector for detecting intensity of reflected light from the output end of the optical signal that is input from said input end; and a second light detector for detecting light intensity of the optical signal that is input from said input end;

means for preventing reflections of said Raman pump waves from preventing proper operation of said first and second light detectors, said means including a wavelength selecting member that blocks Raman pump waves from passing through the member, and that allows substantially all of the optical signals, which are input from the input end and amplified by one of the optical gain mediums, to pass through the member, said wavelength selecting member being located at least either between said light output end and the first light detector for detecting intensity of reflected light from the output end of the optical signal, or between said light input end and the second light detector for detecting light intensity of the optical signal that is input from the input end; and at least one gain control circuit which reduces or turns off an optical gain of corresponding optical medium, either when the reflected light intensity and/or the light reflection ratio from the output end measured by the first light detector exceeds a specified threshold value, or when the input light from the input end intensity measured by the second light detector become smaller than a specified threshold value, wherein at least either the threshold can be changed to a plurality of values in response to a threshold value that corresponds to either an output condition of an optical Raman amplifier or an output condition of the Raman pump waves determined from means for providing an ON/OFF signal of the Raman pump waves.

20. An optical amplifier according to claim 19, wherein said wavelength selecting member is a band-pass filter.

* * * * *